US011208892B2

(12) United States Patent
Roberge

(10) Patent No.: US 11,208,892 B2
(45) Date of Patent: Dec. 28, 2021

(54) ROTOR ASSEMBLY WITH MULTIPLE ROTOR DISKS

(71) Applicant: United Technologies Corporation, Farmington, CT (US)

(72) Inventor: Gary D. Roberge, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 10 days.

(21) Appl. No.: 16/746,321

(22) Filed: Jan. 17, 2020

(65) Prior Publication Data

US 2021/0222557 A1    Jul. 22, 2021

(51) Int. Cl.
    *F01D 5/02*     (2006.01)
    *F01D 5/22*     (2006.01)
    *F01D 5/30*     (2006.01)

(52) U.S. Cl.
CPC ............ *F01D 5/02* (2013.01); *F01D 5/025* (2013.01); *F01D 5/22* (2013.01); *F01D 5/30* (2013.01); *F05D 2220/32* (2013.01); *F05D 2240/24* (2013.01)

(58) Field of Classification Search
CPC ... F01D 5/02; F01D 5/025; F01D 5/30; F01D 5/22; F05D 2240/24; F05D 2220/32
See application file for complete search history.

(56) References Cited

U.S. PATENT DOCUMENTS 1,325,208 A     12/1919   Rice
1,362,074 A * 12/1920   Baumann .............. F01D 5/021
                                                   416/217
2,401,826 A *  6/1946   Halford ................. F01D 5/087
                                                   416/97 R
2,641,440 A     6/1953   Williams
2,657,008 A * 10/1953   Atkinson ................ F01D 5/08
                                                   416/97 R (Continued)

FOREIGN PATENT DOCUMENTS

DE            862231 C      1/1953
EP           1657405 B1     9/2011

OTHER PUBLICATIONS

Freche et al., NACA Research Memorandum, "Investigation of a Gas Turbine with National Bureau of Standards Body 4811 Ceramic Rotor Blades", Oct. 28, 1948, https://ntrs.nasa.gov/archive/nasa/casi.ntrs.nasa.gov/19930085441.pdf.

(Continued)

*Primary Examiner* — Justin D Seabe
*Assistant Examiner* — Theodore C Ribadeneyra
(74) *Attorney, Agent, or Firm* — Getz Balich LLC

(57) ABSTRACT

A rotor assembly is provided for a gas turbine engine. This rotor assembly includes a first rotor disk, a second rotor disk, a plurality of rotor blades and a plurality of disk mounts. The first rotor disk is configured to rotate about a rotational axis. The second rotor disk is configured to rotate about the rotational axis. The rotor blades are arranged circumferentially around the rotational axis. Each of the rotor blades is mounted to the first rotor disk and to the second rotor disk. The rotor blades include a first rotor blade. Each of the disk mounts connects the first rotor disk and the second rotor disk together. The disk mounts include a first disk mount that further supports the first rotor blade.

16 Claims, 27 Drawing Sheets

(56) References Cited

U.S. PATENT DOCUMENTS

| | | | | |
|---|---|---|---|---|
| 2,819,869 | A | * | 1/1958 | Meyer, Jr. ............. F01D 5/3069 416/131 |
| 2,918,252 | A | * | 12/1959 | Haworth .................. F01D 5/06 416/97 R |
| 2,957,675 | A | | 10/1960 | Mason |
| 3,055,633 | A | | 9/1962 | Pouit |
| 3,266,770 | A | | 8/1966 | Jean |
| 3,281,116 | A | * | 10/1966 | Keenan .................... F01D 5/30 416/217 |
| 3,501,090 | A | * | 3/1970 | Losee ...................... F01D 5/34 416/189 |
| 3,982,852 | A | * | 9/1976 | Andersen ................ F01D 5/087 416/95 |
| 4,097,194 | A | * | 6/1978 | Barack .................... F01D 5/021 416/244 A |
| 4,098,559 | A | | 7/1978 | Price |
| 4,102,603 | A | | 7/1978 | Smith |
| 4,802,824 | A | | 2/1989 | Gastebois |
| 4,826,645 | A | * | 5/1989 | Angus ................. B29C 45/0005 164/97 |
| 4,877,376 | A | * | 10/1989 | Sikorski .................. B64C 11/04 416/207 |
| 5,135,354 | A | | 8/1992 | Novotny |
| 5,409,353 | A | * | 4/1995 | Imbault .................. F01D 5/286 416/212 A |
| 5,725,353 | A | * | 3/1998 | Matheny ................. F01D 5/282 416/214 A |
| 5,735,673 | A | * | 4/1998 | Matheny ................. F01D 5/282 416/223 A |
| 5,921,754 | A | * | 7/1999 | Freitas ............... B29D 99/0025 416/230 |
| 5,961,287 | A | | 10/1999 | Cairo |
| 6,213,719 | B1 | * | 4/2001 | Violette .................. B64C 11/06 416/205 |
| 6,241,469 | B1 | | 6/2001 | Beeck |
| 6,267,553 | B1 | | 7/2001 | Burge |
| 7,159,402 | B2 | | 1/2007 | Hein |
| 8,231,354 | B2 | | 7/2012 | Campbell |
| 8,430,623 | B2 | | 4/2013 | Beckford |
| 8,708,657 | B2 | * | 4/2014 | Bayley .................... F01D 5/021 416/219 R |
| 9,482,095 | B2 | * | 11/2016 | Drane .................... F04D 29/324 |
| 9,598,967 | B2 | | 3/2017 | Xu |
| 9,708,917 | B2 | | 7/2017 | Belmonte |
| 9,920,638 | B2 | | 3/2018 | Le Hong |
| 10,024,173 | B2 | | 7/2018 | McCaffrey |
| 10,180,071 | B2 | | 1/2019 | Freeman |
| 10,221,170 | B2 | | 3/2019 | Kamenecka |
| 2005/0084379 | A1 | | 4/2005 | Schreiber |
| 2011/0299992 | A1 | | 12/2011 | Malmborg |
| 2014/0212292 | A1 | * | 7/2014 | Xu ........................... F01D 5/145 416/193 A |
| 2015/0017002 | A1 | | 1/2015 | Freeman |
| 2016/0186569 | A1 | * | 6/2016 | Choi .................... F01D 11/008 416/214 A |
| 2016/0195019 | A1 | | 7/2016 | Roberge |
| 2016/0215627 | A1 | | 7/2016 | Roberge |
| 2017/0320178 | A1 | | 11/2017 | Roberge |
| 2018/0119549 | A1 | | 5/2018 | Vetters |
| 2019/0048889 | A1 | | 2/2019 | Roberge |
| 2019/0203602 | A1 | | 7/2019 | McMahon |
| 2019/0301292 | A1 | | 10/2019 | Harris |
| 2019/0338657 | A1 | | 11/2019 | Freeman |
| 2020/0149422 | A1 | * | 5/2020 | Morrison .................. F01D 5/30 |

OTHER PUBLICATIONS

Office action for U.S. Appl. No. 16/746,286 dated Aug. 19, 2021.
Office action for U.S. Appl. No. 16/796,241 dated Oct. 4, 2021.

* cited by examiner

ROTOR ASSEMBLY WITH MULTIPLE ROTOR DISKS

BACKGROUND OF THE DISCLOSURE

1. Technical Field

This disclosure relates generally to rotational equipment and, more particularly, to rotor blades and associated rotor assemblies.

2. Background Information

Gas turbine engine designers are continually being challenged to provide gas turbine engines with improved performance at reduced weights. One design metric being pushed to provide improved performance is increasing turbine rotational speed. As the turbine speed is increased, however, rotor disk bores also increase in size in order to accommodate increasing centrifugal loading. This can result in bore widths that are so large that heat treating to the center of a bore may become challenging. Rotor disk sizing may also be impacted by rim pull which includes the mass of airfoils and interrupted (circumferentially discontinuous) features created by axially or angled airfoil attachment features.

Current turbine design standard includes separate airfoils that are mechanically attached to a disk using single or multiple tooth attachments; e.g., fir tree attachments. Provision of these attachments result in a live rim (full hoop or circumferentially continuous) that transfers radial loads from the airfoils as well as segmented portions of the disk between airfoil attachments. In addition, cover plates are typically employed to reduce the leakage through attachment from one side of the disk to the other.

There is a need in the art for improved rotor blades and rotor assemblies with reduced weights. This includes rotor blades made using high temperature composites such as ceramic matrix composite (CMC) materials. It should be recognized that designing for such composite airfoils may require new rotor architectures to accommodate and exploit the unique capabilities and limitations of composite materials.

SUMMARY OF THE DISCLOSURE

According to an aspect of the present disclosure, a rotor assembly is provided for a gas turbine engine. This rotor assembly includes a first rotor disk, a second rotor disk, a plurality of rotor blades and a plurality of disk mounts. The first rotor disk is configured to rotate about a rotational axis. The second rotor disk is configured to rotate about the rotational axis. The rotor blades are arranged circumferentially around the rotational axis. Each of the rotor blades is mounted to the first rotor disk and to the second rotor disk. The rotor blades include a first rotor blade. Each of the disk mounts connects the first rotor disk and the second rotor disk together. The disk mounts include a first disk mount that further supports the first rotor blade.

According to another aspect of the present disclosure, another rotor assembly is provided for a gas turbine engine. This rotor assembly includes a first rotor disk, a second rotor disk, a plurality of rotor blades and a plurality of disk mounts. The first rotor disk is configured to rotate about a rotational axis. The second rotor disk is configured to rotate about the rotational axis. The rotor blades are arranged circumferentially around the rotational axis. Each of the rotor blades is axially between the first rotor disk and the second rotor disk. The rotor blades include a first rotor blade. The disk mounts are arranged circumferentially around the rotational axis. Each of the disk mounts connect the first rotor disk and the second rotor disk together. The disk mounts include a first disk mount that projects axially through an aperture in the first rotor blade.

According to still another aspect of the present disclosure, another rotor assembly is provided for a gas turbine engine. This rotor assembly includes a rotor disk assembly, a plurality of rotor blades and a plurality of rotor disk. The rotor disk assembly is configured to rotate about a rotational axis. The rotor disk assembly includes a first rotor disk and a second rotor disk. The rotor blades are arranged circumferentially around the rotational axis. The disk mounts connect the first rotor disk and the second rotor disk together. Each of the disk mounts attach a respective one of the rotor blades to the rotor disk assembly.

The first disk mount may radially retain the first rotor blade with the first rotor disk and the second rotor disk.

The first disk mount may project axially through at least the first rotor blade and the first rotor disk.

The first disk mount may be integral with and may be cantilevered from the second rotor disk.

The rotor blades may also include a second rotor blade that circumferentially neighbors the first rotor blade. The disk mounts may also include a second disk mount that further supports the second rotor blade. The second disk mount may project axially through at least the second rotor blade and the first rotor disk.

The second disk mount may be integral with and may be cantilevered from the second rotor disk.

The rotor blades may also include a second rotor blade that circumferentially neighbors the first rotor blade. The disk mounts may also include a second disk mount that further supports the second rotor blade. The second disk mount may project axially through at least the second rotor blade and the second rotor disk.

The second disk mount may be integral with and may be cantilevered from the first rotor disk.

A retention ring may be included and extends circumferentially through a slot in first disk mount.

The retention ring may also extend circumferentially through a slot in the first rotor disk.

The first disk mount may have a circular cross-section or an elongated cross-section when viewed in a plane perpendicular to the rotational axis.

The first rotor blade may be configured from or otherwise include ceramic.

The first rotor blade may include a first airfoil and a second airfoil.

The first rotor blade may also include a forked mount with a first leg and a second leg. The first airfoil may be connected to the first leg. The second airfoil may be connected to the second leg. The first disk mount may project axially through a channel formed by and between the first leg and the second leg. The first disk mount may radially engage the forked mount.

The first rotor blade may also include a first platform segment and a second platform segment. The first platform segment may be mounted on the first leg and radially retained by the first rotor disk and/or the second rotor disk. The second platform segment may be mounted on the second leg and radially retained by the first rotor disk and/or the second rotor disk.

The first rotor blade may also include a first element and a second element. The first element may be mounted on the first leg and seated in a first notch in the first platform segment. The first element may be configured as at least one of a first seal element or a first damper element. The second element may be mounted on the second leg and seated in a second notch in the second platform segment. The second element may be configured as at least one of a second seal element or a second damper element.

A first flange of the first platform segment may project axially into the first rotor disk. A second flange of the second platform segment may project axially into the first rotor disk.

A seal element may be included, which seal element may be engaged with and between the first platform segment and the second platform segment.

The first rotor disk may radially and circumferentially cover at least an inner radial portion of the first rotor blade. In addition or alternatively, the second rotor disk may radially and circumferentially cover at least the inner radial portion of the first rotor blade.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
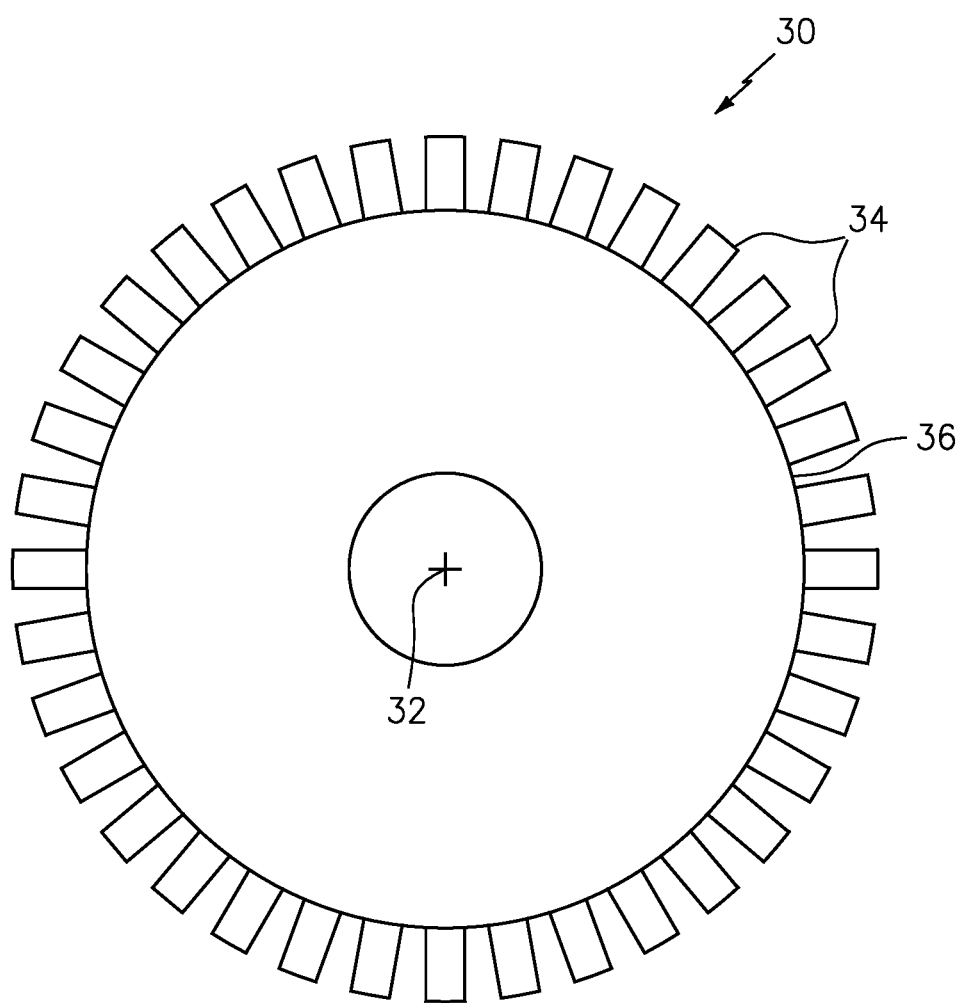
FIG. 1 is a schematic illustration of a bladed rotor assembly for a piece of rotational equipment such as a gas turbine engine.

FIG. 1 illustrates a bladed rotor assembly 30 for rotational equipment with an axial centerline 32, which centerline 32 may be or may be coaxial with an axis of rotation (e.g., a rotational axis) of the rotor assembly 30. An example of such rotational equipment is a gas turbine engine for an aircraft propulsion system, an exemplary embodiment of which is described below in further detail with respect to FIG. 23. However, the rotor assembly 30 of the present disclosure is not limited to such an aircraft application nor a gas turbine engine application. The rotor assembly 30, for example, may alternatively be configured with rotational equipment such as an industrial gas turbine engine, a wind turbine, a water turbine or any other apparatus which includes a bladed rotor.

Figure 2:
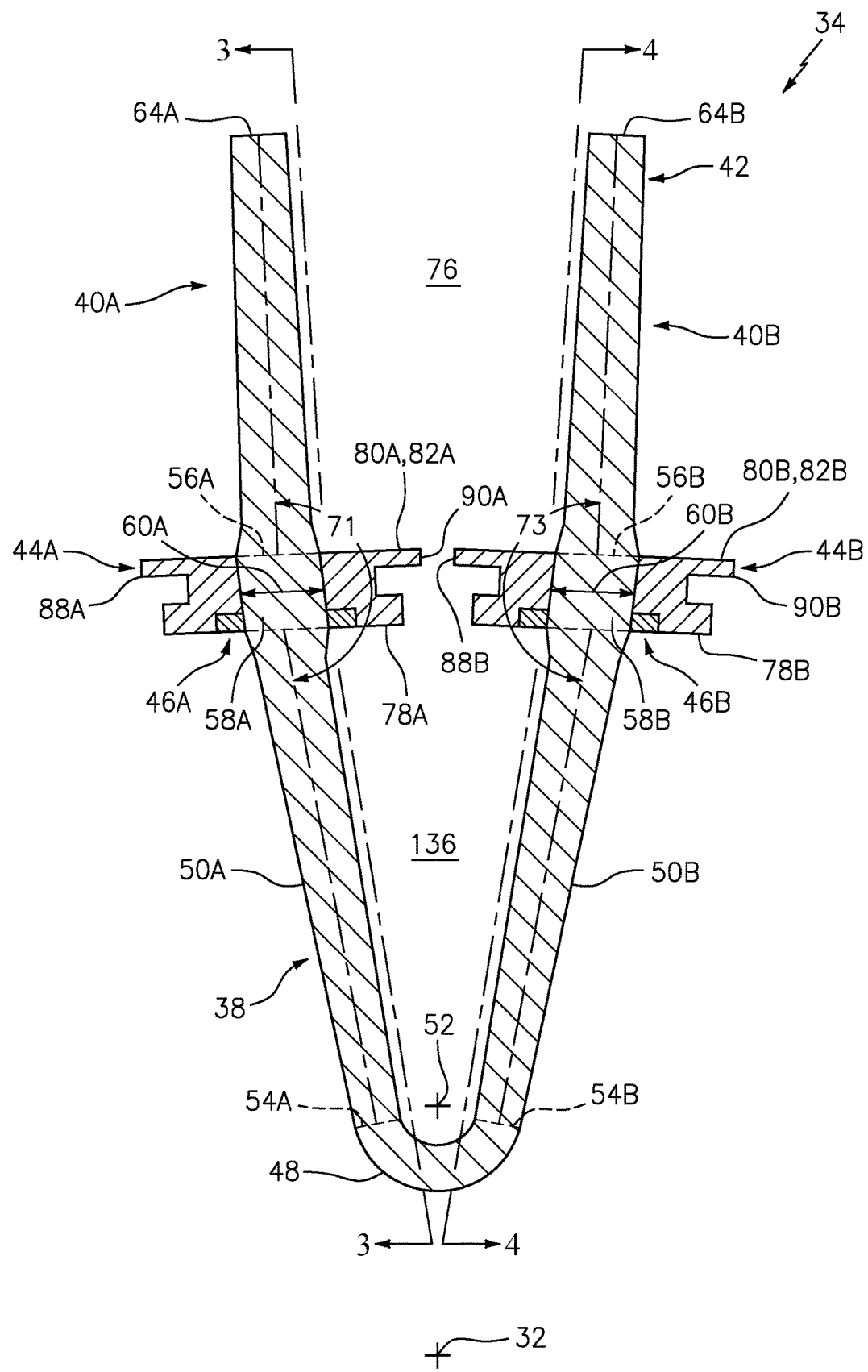
FIG. 2 is a cross-sectional illustration of a portion of a rotor blade configured with a pair of airfoils viewed in a plane perpendicular to a rotational axis of the rotor blade.
Figure 3:
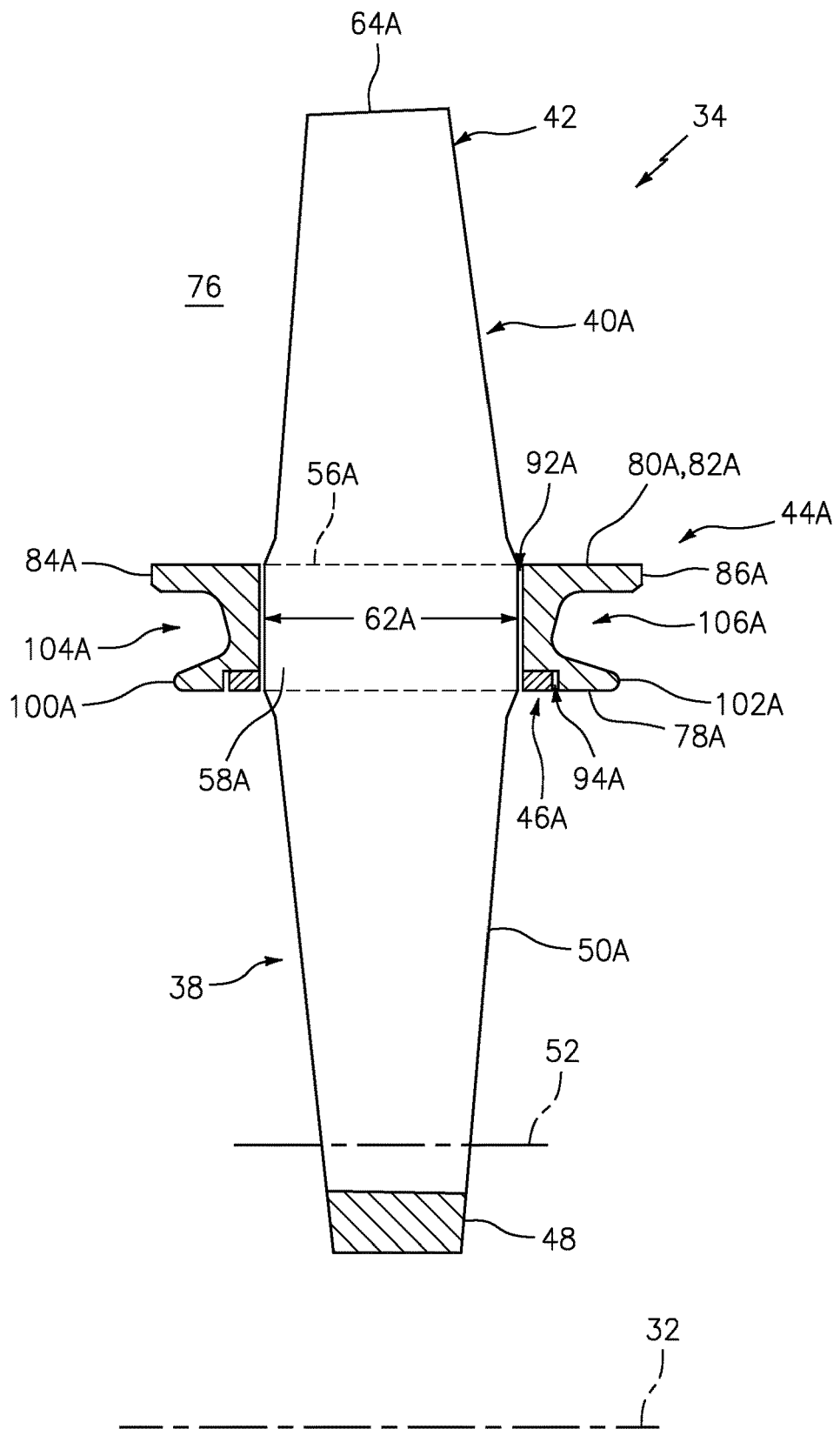
FIG. 3 is a side sectional illustration of the rotor blade taken along line 3-3 in FIG. 2.
Figure 4:
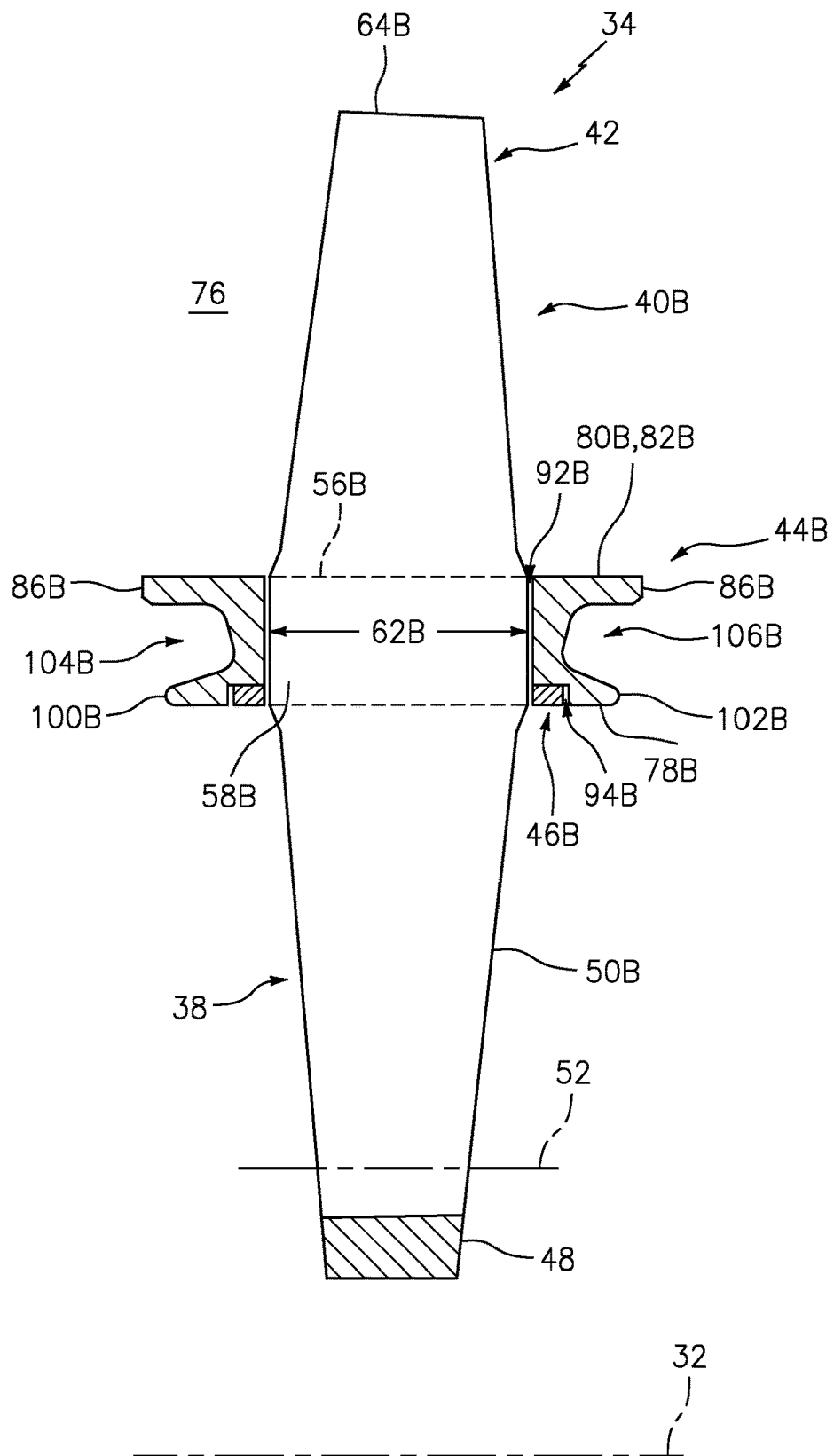
FIG. 4 is a side sectional illustration of the rotor blade taken along line 4-4 in FIG. 2.

The rotor assembly 30 of FIG. 1 includes a plurality of rotor blades 34 and a rotor disk assembly 36. Referring to FIGS. 2-4, each of the rotor blades 34 may be configured as a rotor blade doublet; e.g., a rotor blade that includes two airfoils. The present disclosure, however, is not limited to such an exemplary rotor blade configuration. For example, in other embodiments, one or more or each rotor blade 34 may alternatively be configured with a single airfoil, or with more than two airfoils.

Referring still to FIGS. 2-4, each rotor blade 34 includes a rotor blade mount 38 and one or more rotor blade airfoils 40A and 40B (generally referred to as "40"). In the embodiment of FIGS. 2-4, at least, or only, the rotor blade components 38 and 40 collectively form a single rotor blade pair 42. Each rotor blade 34 may also include one or more rotor blade platform segments 44A and 44B (generally referred to as "44") and/or one or more additional rotor blade elements 46A and 46B (generally referred to as "46").

The blade mount 38 of FIGS. 2-4 is configured with a forked body; e.g., a V-shaped or U-shaped body. The blade mount 38 of FIGS. 2-4, for example, includes a rotor blade mount bridge 48 (e.g., an intermediate segment) and a plurality of rotor blade mount legs 50A and 50B (generally referred to as "50").

Figure 19:
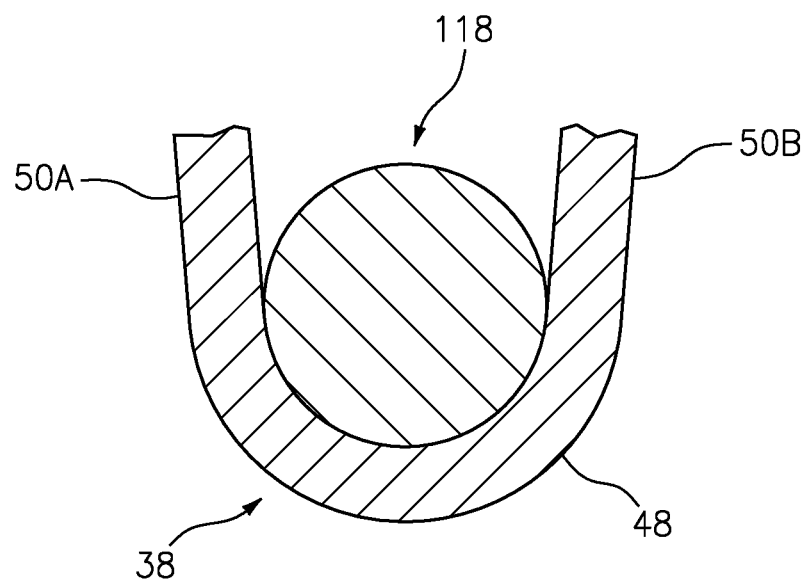
FIG. 19 is a cross-sectional illustration of a disk mount mated with a blade mount.
Figure 20:
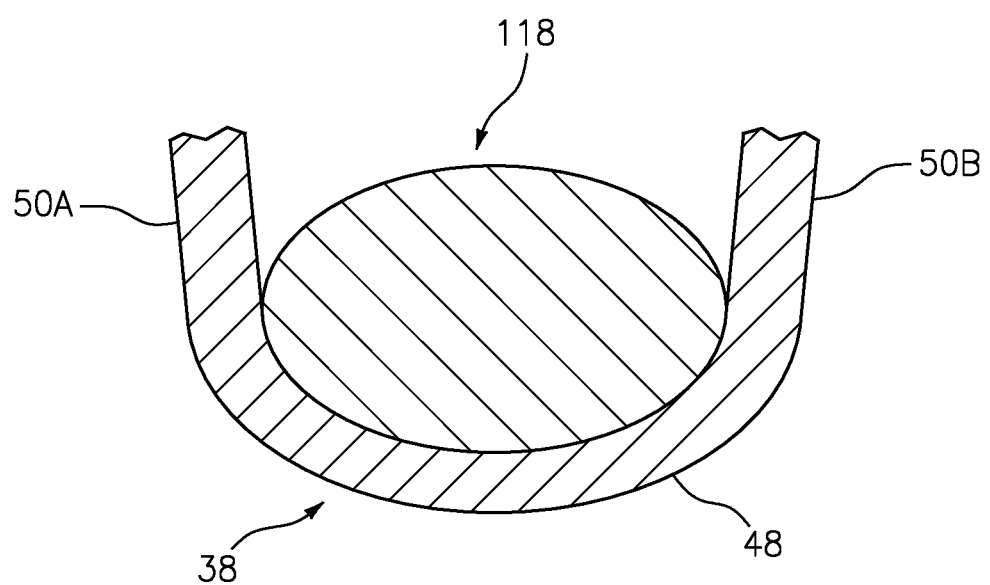
FIG. 20 is a cross-sectional illustration of another disk mount mated with another blade mount.

The bridge 48 has an arcuate (e.g., partially circular, oval or elliptical) configuration when viewed in a plane perpendicular to the centerline 32; e.g., plane of FIG. 2; see also FIGS. 19 and 20. The bridge 48 of FIG. 2, for example, extends partially (e.g., circumferentially) about a disk mount axis 52 between opposing first and second bridge ends 54A and 54B. The bridge 48 is arranged laterally (e.g., circumferentially relative to the centerline 32) between the first leg 50A and the second leg 50B.

Referring to FIGS. 2 and 3, the first leg 50A is connected (e.g., directly or indirectly) to the bridge 48 at (e.g., on, adjacent or proximate) the first bridge end 54A. The first leg 50A projects generally radially relative to the centerline 32 out from the first bridge end 54A, in a direction towards the first airfoil 40A, to a first leg outer end 56A.

Figure 5:
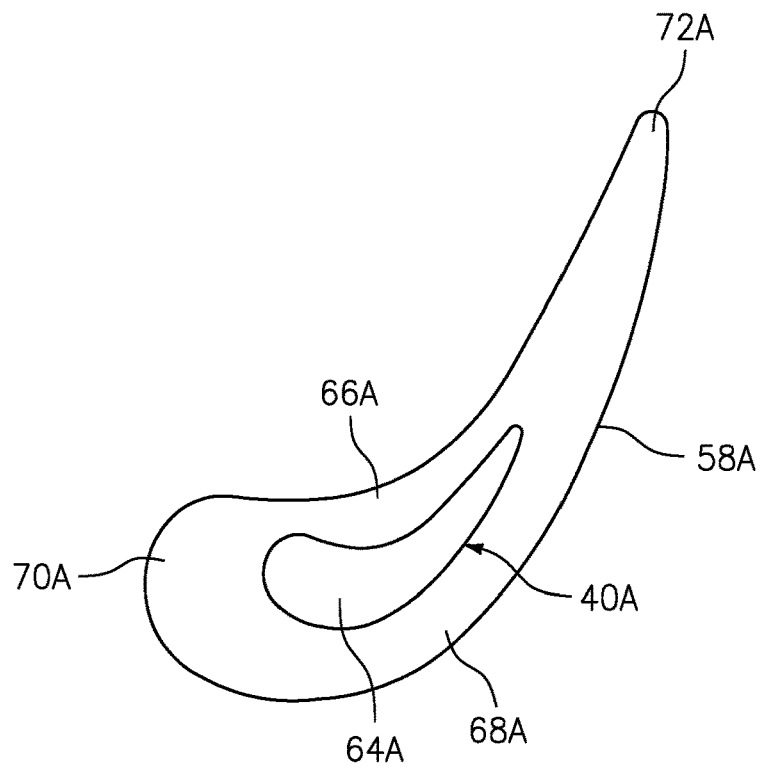
FIG. 5 is a radial outside view of a first tip portion of the rotor blade in FIG. 3.

The first leg 50A of FIGS. 2 and 3 is configured with a first land 58A for the first platform segment 44A and/or the first rotor blade element 46A at the first leg outer end 56A. This first land 58A may be configured with a first axial width 60A (see FIG. 2) and a first lateral (e.g., circumferential) width 62A (see FIG. 3). The first axial width 60A may be substantially constant along an entirety or a (e.g., substantial) portion of a longitudinal (e.g., radial) length of the first land 58A. This first axial width 60A may also be selected to be a maximum axial width of a first side of the rotor blade pair 42. The first lateral width 62A may be substantially constant along the entirety or a (e.g., substantial) portion of the longitudinal length of the first land 58A. This first lateral width 62A may also be selected to be a maximum lateral width of the first side of the rotor blade pair 42. A cross-sectional shape of the first land 58A may substantially match a cross-sectional shape of the first airfoil 40A as shown in FIG. 5; however, the present disclosure is not limited to such an exemplary embodiment.

Referring to FIG. 2, the first leg 50A may flare out laterally (e.g., circumferentially) as the first leg 50A extends longitudinally (e.g., radially) from/away from the bridge 48 to/towards the first land 58A. Referring to FIG. 3, the first leg 50A may also or alternatively flare out axially as the first leg 50A extends longitudinally from/away from the bridge 48 to/towards the first land 58A.

Referring to FIGS. 2 and 4, the second leg 50B is connected (e.g., directly or indirectly) to the bridge 48 at (e.g., on, adjacent or proximate) the second bridge end 54B. The second leg 50B projects generally radially relative to the centerline 32 out from the second bridge end 54B, in a direction towards the second airfoil 40B, to a second leg outer end 56B. Referring to FIG. 2, as the first leg 50A and the second leg 50B project radially outwards from the bridge 48, those legs 50 may laterally (e.g., circumferentially) diverge/flare out from one another. This enables the lateral width of the bridge 48 to be sized smaller than a lateral spacing between the airfoils 40.

Figure 6:
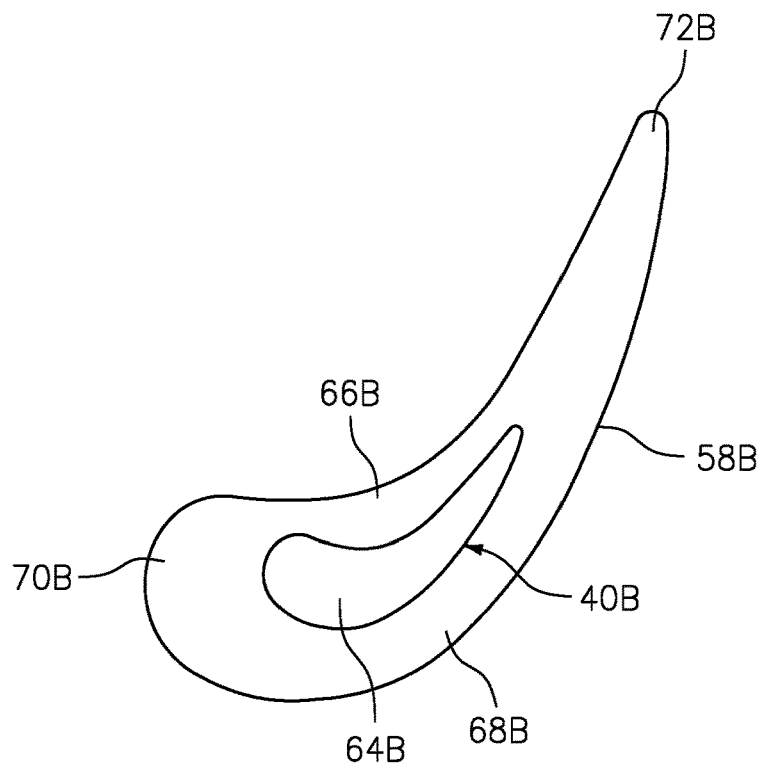
FIG. 6 is a radial outside view of a second tip portion of the rotor blade in FIG. 4.

The second leg 50B of FIGS. 2 and 4 is configured with a second land 58B for the second platform segment 44B and/or the second rotor blade element 46B at the second leg outer end 56B. This second land 58B may be configured with a second axial width 60B (see FIG. 2) and a second lateral (e.g., circumferential) width 62B (see FIG. 4). The second axial width 60B may be substantially constant along an entirety or a (e.g., substantial) portion of a longitudinal (e.g., radial) length of the second land 58B. This second axial width 60B may also be selected to be a maximum axial width of a second side of the rotor blade pair 42. The second axial width 60B may be equal to the first axial width 60A. The second lateral width 62B may be substantially constant along the entirety or a (e.g., substantial) portion of the longitudinal length of the second land 58B. This second lateral width 62B may also be selected to be a maximum lateral width of the second side of the rotor blade pair 42. The second lateral width 62B may be equal to the first lateral width 62A. A cross-sectional shape of the second land 58B may substantially match a cross-sectional shape of the second airfoil 40B as shown in FIG. 6; however, the present disclosure is not limited to such an exemplary embodiment.

Referring to FIG. 2, the second leg 50B may flare out laterally (e.g., circumferentially) as the second leg 50B extends longitudinally (e.g., radially) from/away from the bridge 48 to/towards the second land 58B. Referring to FIG. 4, the second leg 50B may also or alternatively flare out axially as the second leg 50B extends longitudinally from/away from the bridge 48 to/towards the second land 58B.

The legs 50A and 50B are shown as solid bodies. However, in other embodiments, one or each of the legs 50A and 50B may be hollow (e.g., include an internal passage or conduit) for flowing cooling air, for example, to the airfoils 40A, 40B.

Referring to FIGS. 2 and 3, the first airfoil 40A is connected (e.g., directly or indirectly) to the first leg 50A at (e.g., on, adjacent or proximate) the first leg outer end 56A. The first airfoil 40A projects generally radially relative to the centerline 32 out from the first leg outer end 56A, in a spanwise direction, to a first (e.g., unshrouded) tip 64A of the first airfoil 40A. Referring to FIG. 5, the first airfoil 40A includes a first (e.g., pressure and/or concave) side surface 66A and a second (e.g., suction and/or convex) side surface 68A. These first and second side surfaces 66A and 68A extends along a chord line of the first airfoil 40A between and meet at a (e.g., forward and/or upstream) leading edge 70A and a (e.g., aft and/or downstream) trailing edge 72A.

Referring to FIG. 2, a centerline of the first airfoil 40A may be angularly offset from a centerline of the first leg 50A by an angle 71. This angle 71 may be less than (or more than) one-hundred and eighty degrees (180°) as shown in FIG. 2. Alternatively, the angle 71 may be equal to one-hundred and eighty degrees (180°) such that the first airfoil 40A is parallel with the first leg 50A. A reduction in angular offset between the first airfoil 40A and the first leg 50A (e.g., closer to parallel) may result in minimizing or eliminating bending created by the centrifugal loading as the rotor assembly spins about axis 32.

The second airfoil 40B is arranged laterally (e.g., circumferentially) next to the first airfoil 40A. The second airfoil 40B thereby laterally directly neighbors the first airfoil 40A to one side of the first airfoil 40A. Referring to FIGS. 2 and 4, the second airfoil 40B is connected (e.g., directly or indirectly) to the second leg 50B at (e.g., on, adjacent or proximate) the second leg outer end 56B. The second airfoil 40B projects generally radially relative to the centerline 32 out from the second leg outer end 56B, in a spanwise direction, to a second (e.g., unshrouded) tip 64B of the second airfoil 40B. Referring to FIG. 6, the second airfoil 40B includes a first (e.g., pressure and/or concave) side surface 66B and a second (e.g., suction and/or convex) side surface 68B. These first and second side surfaces 66B and 68B extends along a chord line of the second airfoil 40B between and meet at a (e.g., forward and/or upstream) leading edge 70B and a (e.g., aft and/or downstream) trailing edge 72B.

Referring to FIG. 2, a centerline of the second airfoil 40B may be angularly offset from a centerline of the second leg 50B by an angle 73. This angle 73 may be less than (or more than) one-hundred and eighty degrees (180°) as shown in FIG. 2. Alternatively, the angle 73 may be equal to one-hundred and eighty degrees (180°) such that the second airfoil 40B is parallel with the second leg 50B. A reduction in angular offset between the second airfoil 40B and the second leg 50B (e.g., closer to parallel) may result in minimizing or eliminating bending created by the centrifugal loading as the rotor assembly spins about axis 32.

The rotor blade pair 42 and its various components (e.g., 38 and 40) of FIGS. 2-6 may be configured together as a monolithic body. The term "monolithic" may describe a single unitary body formed without severable components. For example, the rotor blade pair 42 may be laid up, cast, machined and/or otherwise formed from a single body of material. In another example, the rotor blade pair 42 may be formed from a plurality of discretely formed segments which are subsequently permanently bonded together; e.g., welded, adhered, etc. Examples of bonding concepts include, but are not limited to, transient liquid phase (TLP) bonding of one or more components to form a single unitized structure blade pair. These components may consist of single crystal and/or poly-crystalline or directionally controlled crystalline structures that are individually oriented in an optimized manner to provide locally desired structural capability. By contrast, the term "non-monolithic" may described a body formed from a plurality of discretely formed bodies that are severable; e.g., may be disassembly from one another. For example, a non-monolithic body may be formed from a plurality of discretely formed segments which are subsequently mechanically attached and/or brazed together. The present disclosure, however, is not limited to monolithic rotor blade pairs.

Figure 7:
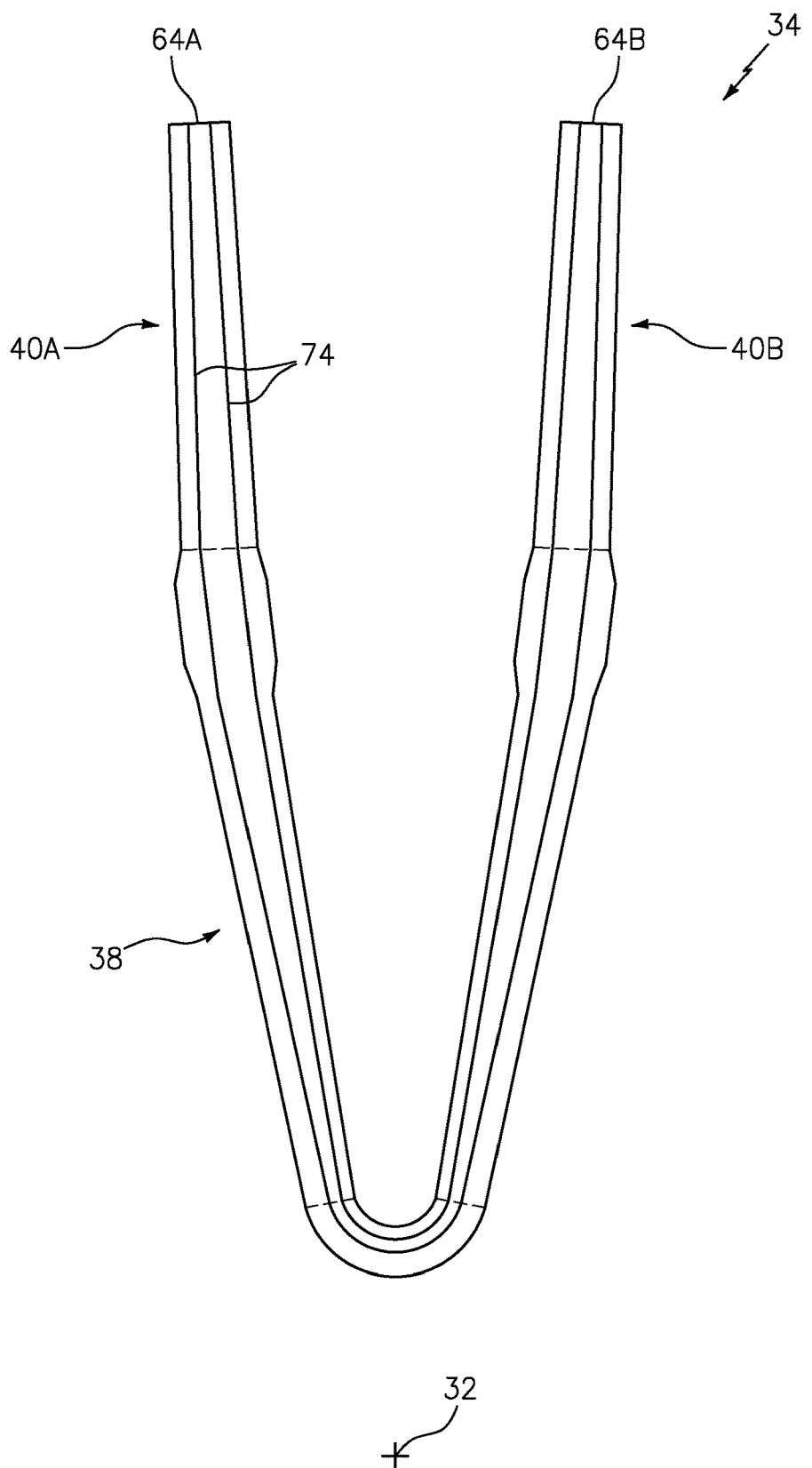
FIG. 7 is an illustration of a rotor blade pair depicted with exemplary strands of fiber reinforcement.

The rotor blade pair 42 and its various components (e.g., the monolithic body) may be formed from various metallic or non-metallic materials. Examples of the rotor blade materials include, but are not limited to, metal, intermetallic material and/or ceramic. Examples of the metal include, but are not limited to, nickel (Ni), titanium (Ti), aluminum (Al), chromium (Cr) or an alloy of one or more of the foregoing metals; e.g., a single crystal alloy or super alloy. Examples of the intermetallic material include, but are not limited to, TiAl and NiAl. The ceramic may be a monolithic ceramic or a ceramic matrix composite (CMC) material. An example of the monolithic ceramic is, but is not limited to, $Si_3N_4$. Examples of the ceramic matrix composite material include, but are not limited to, SiC/SiC and C/SiC. In the case of the ceramic matrix composite material, a fiber reinforcement (e.g., long fibers or woven fibers) within a matrix of the CMC material may be laid to follow at least partially or completely along a longitudinal length of the rotor blade pair 42 as illustrated in, for example, FIG. 7 with two exemplary long fibers 74 of the fiber reinforcement. With such an arrangement, the fiber reinforcement may substantially remain in tension during operation of the rotor assembly 30. The present disclosure, however, is not limited to such an exemplary fiber reinforcement orientation, nor to the foregoing exemplary materials.

Figure 8:
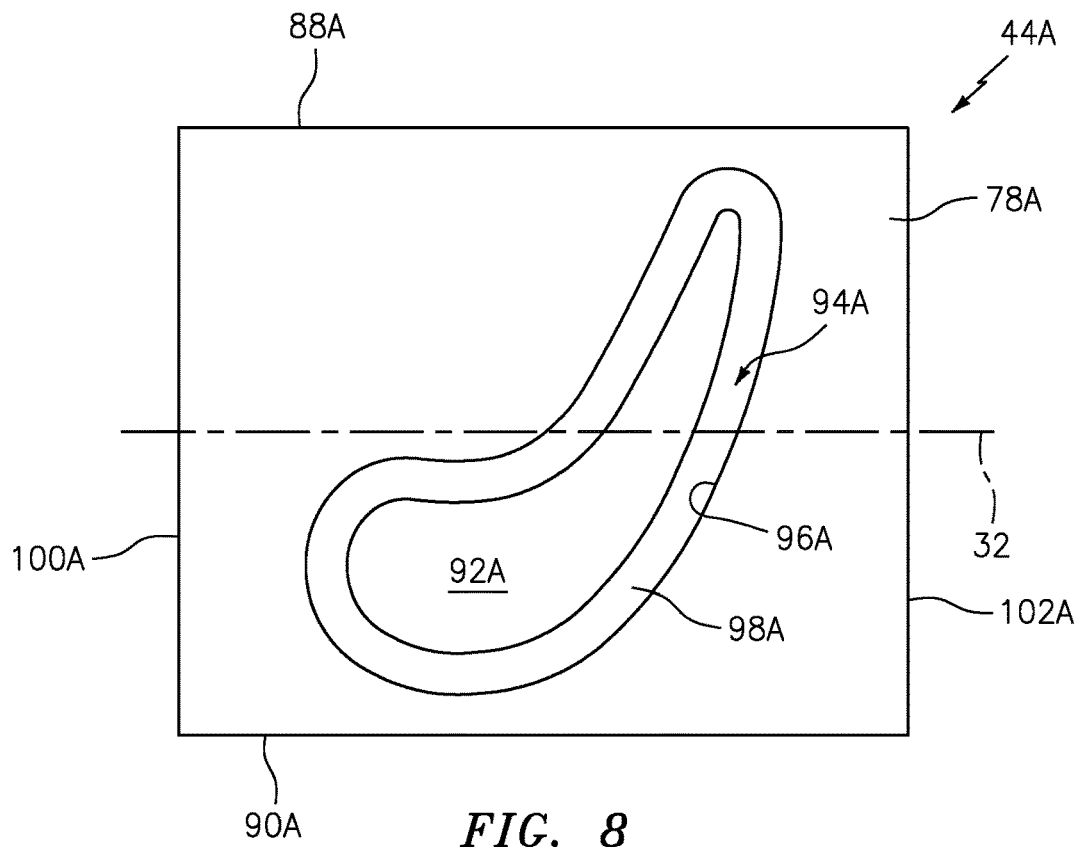
FIG. 8 is a radial inside view of a first platform segment.

Referring to FIGS. 2, 3 and 8, the first platform segment 44A is configured to form a portion of an inner peripheral boarder of a gas path 76 (e.g., a core gas path) extending axially across the rotor assembly 30; e.g., a gas path into which the airfoils 40 extend. The first platform segment 44A, for example, extends radially relative to the centerline 32 between an inner end 78A and an outer end 80A. The outer end 80A of the first platform segment 44A carries a first platform gas path surface 82A, which forms the respective inner peripheral boarder portion of the gas path 76. As best seen in FIG. 3, this first platform gas path surface 82A extends axially between a first (e.g., forward and/or upstream) side 84A and a second (e.g., aft and/or downstream) side 86A. As best seen in FIG. 2, the first platform gas path surface 82A extends laterally (e.g., circumferentially) between opposing lateral sides 88A and 90A.

Referring to FIG. 8, the first platform segment 44A is configured with a platform first bore 92A, which is configured to receive the first land 58A; e.g., see FIG. 3. This first bore 92A extends radially through the first platform segment 44A between its inner end 78A and its outer end 80A. A cross-sectional shape and size of the first bore 92A may be substantially identical to (e.g., but slightly larger than) the cross-sectional shape and size of the first land 58A; e.g., see FIGS. 2, 3, 5 and 8.

Referring to FIGS. 3 and 8, the first platform segment 44A may also be configured with a (e.g., annular) first notch 94A for receiving the first rotor blade element 46A. This first notch 94A may project from the first bore 92A laterally and/or axially partially into the first platform segment 44A to a first notch side surface 96A (see FIG. 8). The first notch 94A may project from the inner end 78A radially partially into the first platform segment 44A to a first notch end surface 98A (see FIG. 8). A cross-sectional shape and size of the first notch 94A may be substantially identical to (e.g., but slightly larger than) the cross-sectional shape and size of the first rotor blade element 46A; e.g., see FIGS. 2, 3, 8 and 10.

Referring to FIG. 3, the first platform segment 44A includes one or more flanges 100A and 102A. The first flange 100A is positioned at the first side 84A. The first flange 100A projects laterally out form a base of the first platform segment 44A to a distal first flange end. The first flange 100A may extend along an entire axial length of the first platform segment 44A, or partially axially along the first platform segment 44A. The first platform gas path surface 82A may project laterally beyond/past the distal first flange end; however, the present disclosure is not limited to such an exemplary embodiment. With such an arrangement, a first channel 104A extends partially laterally into and radially within the first platform segment 44A.

The second flange 102A is positioned at the second side 86A. The second flange 102A projects laterally out form the base of the first platform segment 44A to a distal second flange end. The second flange 102A may extend along the entire axial length of the first platform segment 44A, or partially axially along the first platform segment 44A. The first platform gas path surface 82A may project laterally beyond/past the distal second flange end; however, the present disclosure is not limited to such an exemplary embodiment. With such an arrangement, a second channel 106A extends partially laterally into and radially within the first platform segment 44A.

Figure 9:
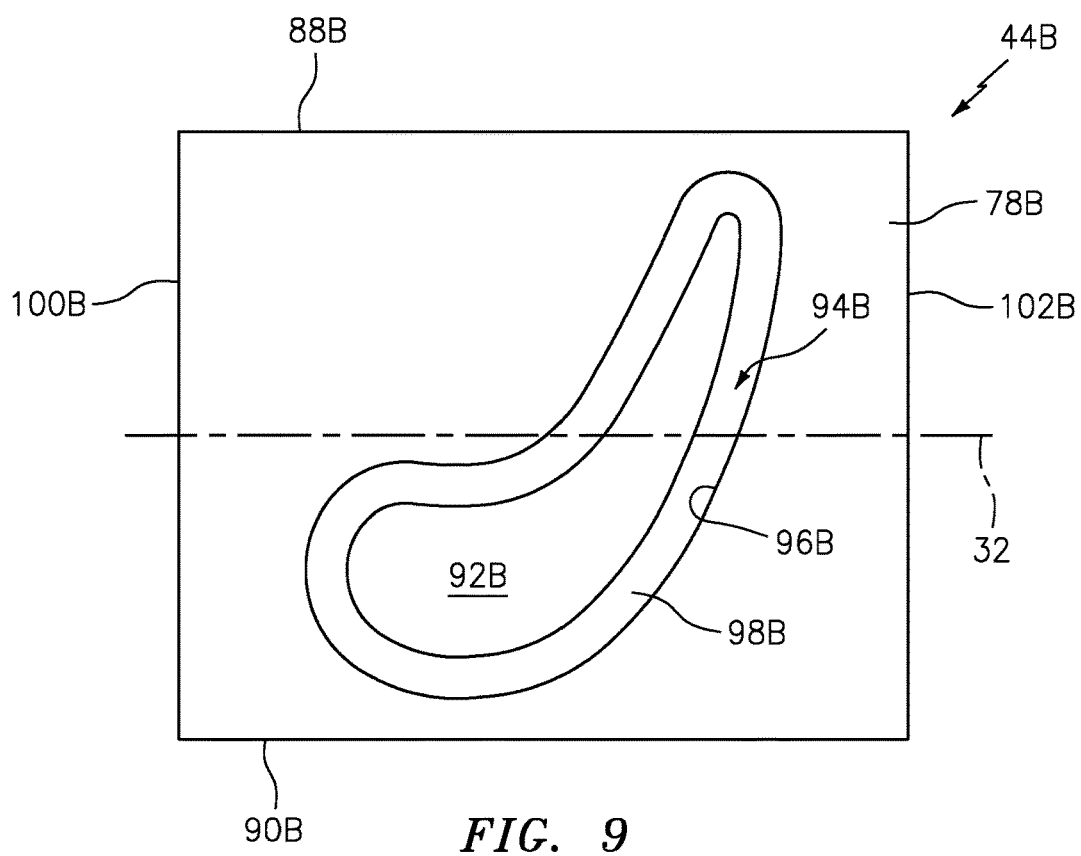
FIG. 9 is a radial inside view of a second platform segment.

Referring to FIGS. 2, 4 and 9, the second platform segment 44B is configured to form another portion of the inner peripheral boarder of the gas path 76 extending axially across the rotor assembly 30. The second platform segment 44B, for example, extends radially relative to the centerline 32 between an inner end 78B and an outer end 80B. The outer end 80B of the second platform segment 44B carriers a second platform gas path surface 82B, which forms the respective inner peripheral boarder portion of the gas path 76. As best seen in FIG. 4, this second platform gas path surface 82B extends axially between a first (e.g., forward and/or upstream) side 84B and a second (e.g., aft and/or downstream) side 86B. The second platform gas path surface 82B extends laterally (e.g., circumferentially) between opposing lateral sides 88B and 90B.

The second platform segment 44B is configured with a platform second bore 92B, which is configured to receive the second land 58B; e.g., see FIG. 4. This second bore 92B extends radially through the second platform segment 44B between its inner end 78B and its outer end 80B. A cross-sectional shape and size of the second bore 92B may be substantially identical to (e.g., but slightly larger than) the cross-sectional shape and size of the second land 58B; e.g., see FIGS. 2, 4, 6 and 9.

Referring to FIGS. 4 and 9, the second platform segment 44B may also be configured with a (e.g., annular) second notch 94B for receiving the second rotor blade element 46B. This second notch 94B may project from the second bore 92B laterally and/or axially partially into the second platform segment 44B to a second notch side surface 96B. The second notch 94B may project from the inner end 78B radially partially into the second platform segment 44B to a second notch end surface 98B. A cross-sectional shape and size of the second notch 94B may be substantially identical to (e.g., but slightly larger than) the cross-sectional shape and size of the second rotor blade element 46B; e.g., see FIGS. 2, 4, 9 and 10.

Referring to FIG. 4, the second platform segment 44B includes one or more loading flanges 100B and 102B. The first flange 100B is positioned at the first side 84B. The first flange 100B projects laterally out form a base of the second platform segment 44B to a distal first flange end. The first flange 100B may extend along an entire axial length of the second platform segment 44B, or partially axially along the second platform segment 44B. The second platform gas path surface 82B may project laterally beyond/past the distal first flange end; however, the present disclosure is not limited to such an exemplary embodiment. With such an arrangement, a first channel 104B extends partially laterally into and radially within the second platform segment 44B.

The second flange 102B is positioned at the second side 86B. The second flange 102B projects laterally out form the base of the second platform segment 44B to a distal second flange end. The second flange 102B may extend along the entire axial length of the second platform segment 44B, or partially axially along the second platform segment 44B. The second platform gas path surface 82B may project laterally beyond/past the distal second flange end; however, the present disclosure is not limited to such an exemplary embodiment. With such an arrangement, a second channel 106B extends partially laterally into and radially within the second platform segment 44B.

Each of the platform segments 44 may be configured as a monolithic body. Each platform segment 46 may be formed from various metallic or non-metallic materials, which may be the same or different than the rotor blade 40 material. Examples of the platform segment materials include, but are not limited to, metal, intermetallic material and/or ceramic. Examples of the metal include, but are not limited to, nickel (Ni), titanium (Ti), aluminum (Al), chromium (Cr) or an alloy of one or more of the foregoing metals; e.g., a single crystal alloy or super alloy. Examples of the intermetallic material include, but are not limited to, TiAl and NiAl. The ceramic may be a monolithic ceramic or a ceramic matrix composite (CMC) material. An example of the monolithic ceramic is, but is not limited to, $Si_3N_4$. Examples of the ceramic matrix composite material include, but are not limited to, SiC/SiC and C/SiC. The present disclosure, however, is not limited to the foregoing exemplary materials. In addition, due to possible differences in material between platform segment 44 and the rotor blade 42, the platform segment 46 may be configured as a cooled component utilizing one or more heat transfer approaches including convective, film and transpirational cooling.

Figure 10:
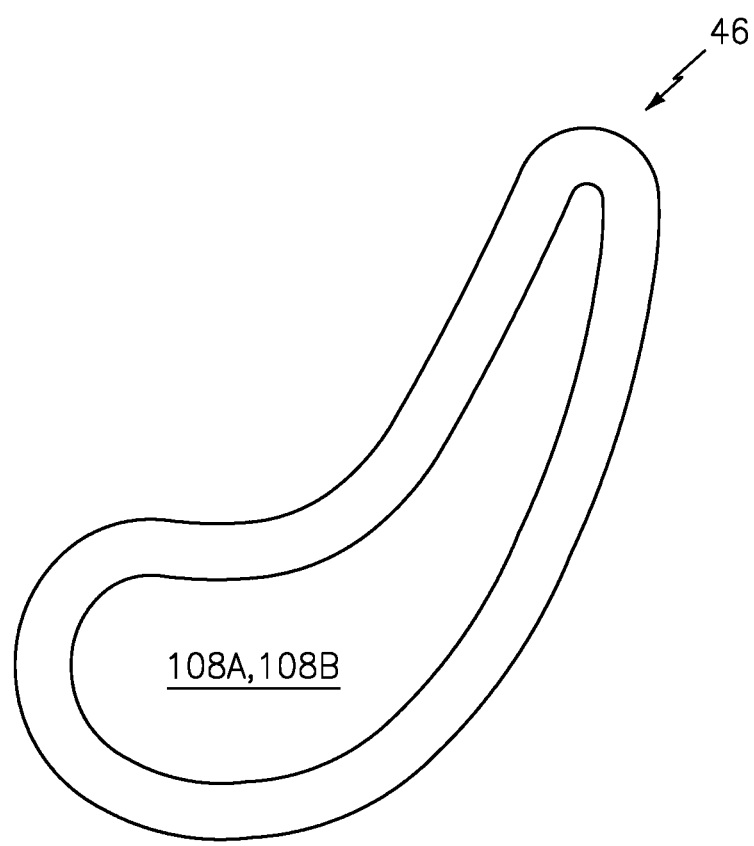
FIG. 10 is an illustration of a rotor blade element configured as a seal element and/or a damper element.

Referring to FIG. 10, each of the rotor blade elements 46 may be configured as a seal element (e.g., a seal ring) and/or a vibration damper element. Each rotor blade element 46 of FIG. 10 is configured as an annular body. Each rotor blade element 46 is configured with an inner cross-sectional shape and size that may be substantially identical to (e.g., but slightly larger than) the cross-sectional shape and size of the respective first land 58A or second land 58B; e.g., see FIGS. 2, 3, 5 and 10; or FIGS. 2, 4, 6 and 10. In addition or alternatively, each rotor blade element 46 is configured with an outer cross-sectional shape and size that may be substantially identical to (e.g., but slightly smaller than) the cross-sectional shape and size of the respective first notch 94A or second notch 94B; e.g., see FIGS. 2, 3, 8 and 10; or FIGS. 2, 4, 9 and 10.

Each rotor blade element 46 may be configured from any suitable material such as, but not limited to, metal. Examples of the metal include, but are not limited to, nickel (Ni), titanium (Ti), aluminum (Al), chromium (Cr), cobalt (Co) or an alloy of one or more of the foregoing metals; e.g., a single crystal alloy or super alloy. The present disclosure, however, is not limited to the foregoing exemplary rotor blade element materials, or metal in general.

Figure 11:
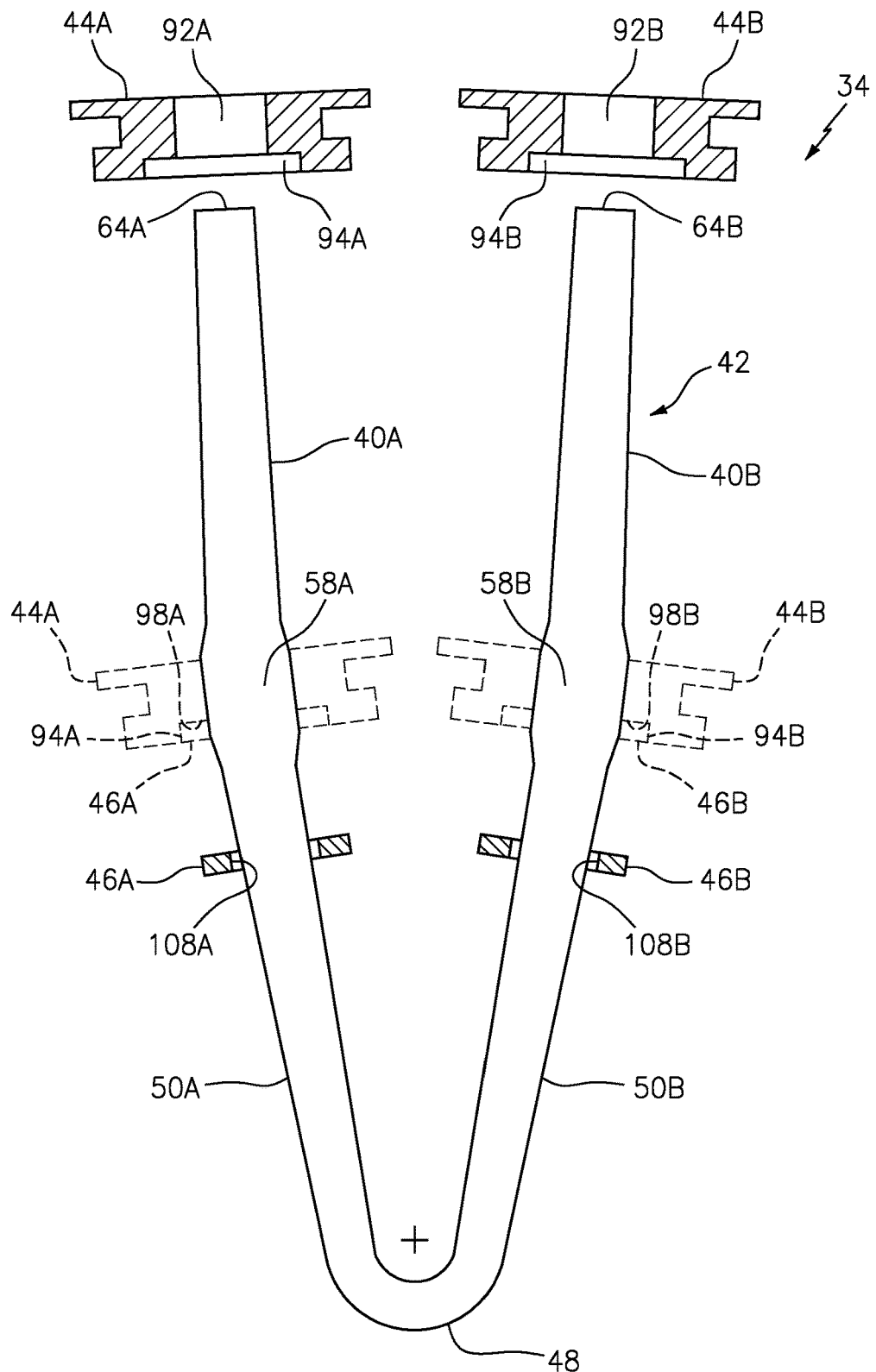
FIG. 11 is an illustration of the rotor blade during an assembly process.

Referring to FIG. 11, the rotor blade components 44 and 46 are mounted to the rotor blade pair 42 during assembly of each rotor blade 34. The first rotor blade element 46A, for example, may be slide onto the first airfoil 40A such that the airfoil 40A projects radially into a bore 108A (see FIG. 10) of the first rotor blade element 46A. The first rotor blade element 46A may then be moved along the first airfoil 40A until the element 46A is on the first leg 50A; e.g., the first leg 50A projects radially through the first rotor blade element bore 108A. While the first platform segments 44A is being mounted, the first rotor blade element 46A may be moved below the first land 58A.

The first platform segment 44A may be slide onto the first airfoil 40A such that the airfoil 40A projects into the first bore 92A. The first platform segment 44A may then be moved along the first airfoil 40A until the segment 44A is on the first leg 50A; e.g., the first leg 50A projects radially through the first bore 92A. The first platform segment 44A is seated on the first land 58A and thereby arranged/mounted with the rotor blade pair 42. The first rotor blade element 46A may then be moved radially outward and seated within the first notch 94A in the first platform segment 44A. With this arrangement, the first rotor blade element 46A is operable to radially engage (e.g., contact) the first notch end surface 98A as well as a land surface of the first land 58A. The first rotor blade element 46A may thereby seal a gap between the first platform segment 44A and the first land 58A.

The second rotor blade element 46B may be slide onto the second airfoil 40B such that the airfoil 40B projects radially into a bore 108B (see FIG. 10) of the second rotor blade element 46B. The second rotor blade element 46B may then be moved along the second airfoil 40B until the element 46B is on the second leg 50B; e.g., the second leg 50B projects radially through the second rotor blade element bore 108B.

While the second platform segments 44B is being mounted, the second rotor blade element 46B may be moved below the second land 58B.

The second platform segment 44B may be slide onto the second airfoil 40B such that the airfoil 40B projects into the second bore 92B. The second platform segment 44B may then be moved along the second airfoil 40B until the segment 44B is on the second leg 50B; e.g., the second leg 50B projects radially through the second bore 92B. The second platform segment 44B is seated on the second land 58B and thereby arranged/mounted with the rotor blade pair 42. The second rotor blade element 46B may then be moved radially outward and seated within the second notch 94B in the second platform segment 44B. With this arrangement, the second rotor blade element 46B is operable to radially engage (e.g., contact) the second notch end surface 98B as well as a land surface of the second land 58B. The second rotor blade element 46B may thereby seal a gap between the second platform segment 44B and the second land 58B.

Figure 12:
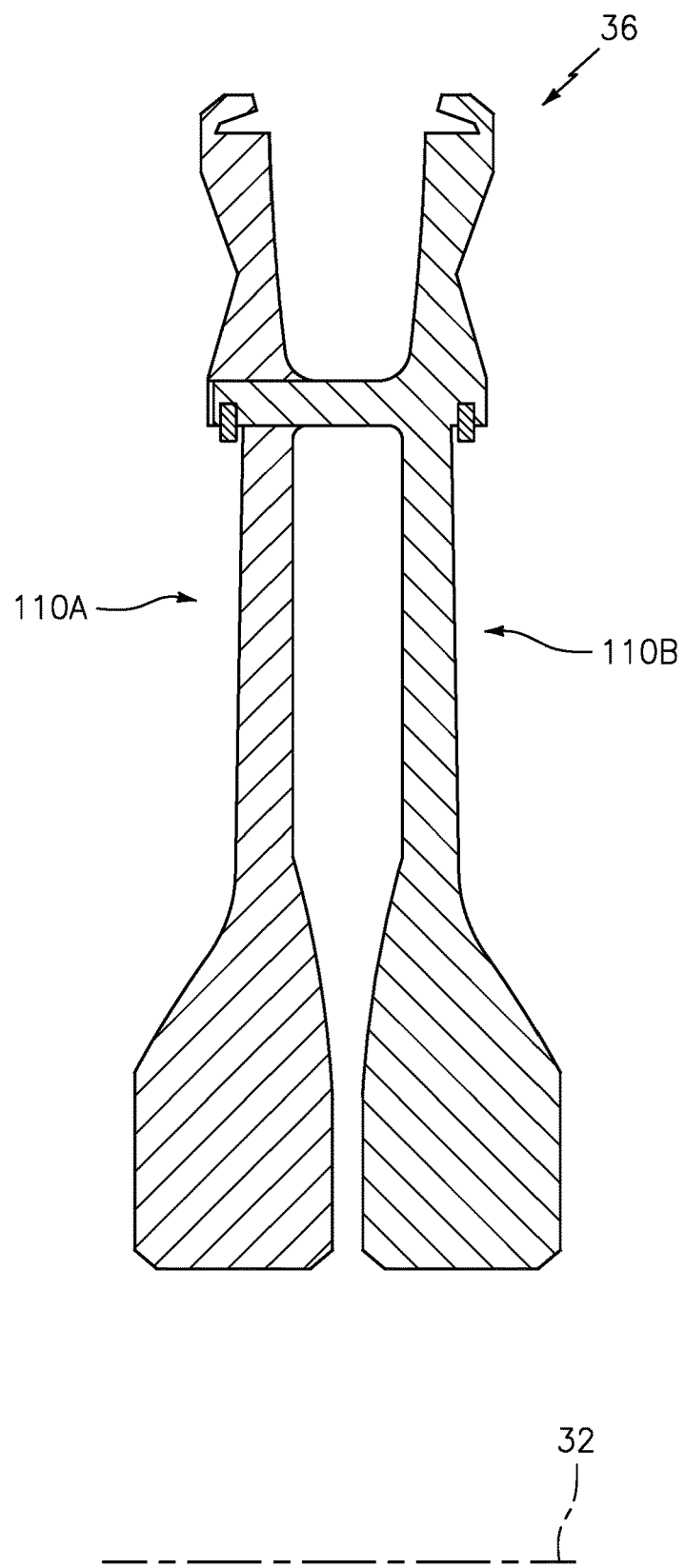
FIG. 12 is side sectional illustration of a portion of a rotor disk assembly viewed in a plane perpendicular to a rotational axis of the rotor disk assembly.

Referring to FIG. 12, the rotor disk assembly 36 includes one or more rotor disks such as a first (e.g., upstream/forward) rotor disk 110A and a second (e.g., downstream/aft) rotor disk 110B. Each rotor disk 110A, 110B (generally referred to as "110") extends circumferentially about (e.g., complete around) the centerline 32 to provide that rotor disk with a full hoop, annular body. This annular body may be a monolithic body. Alternatively, the annular body may be formed from a plurality of interconnected arcuate circumferential segments; e.g., disk halves, disk thirds, disk quarters, etc.

Figure 13A:
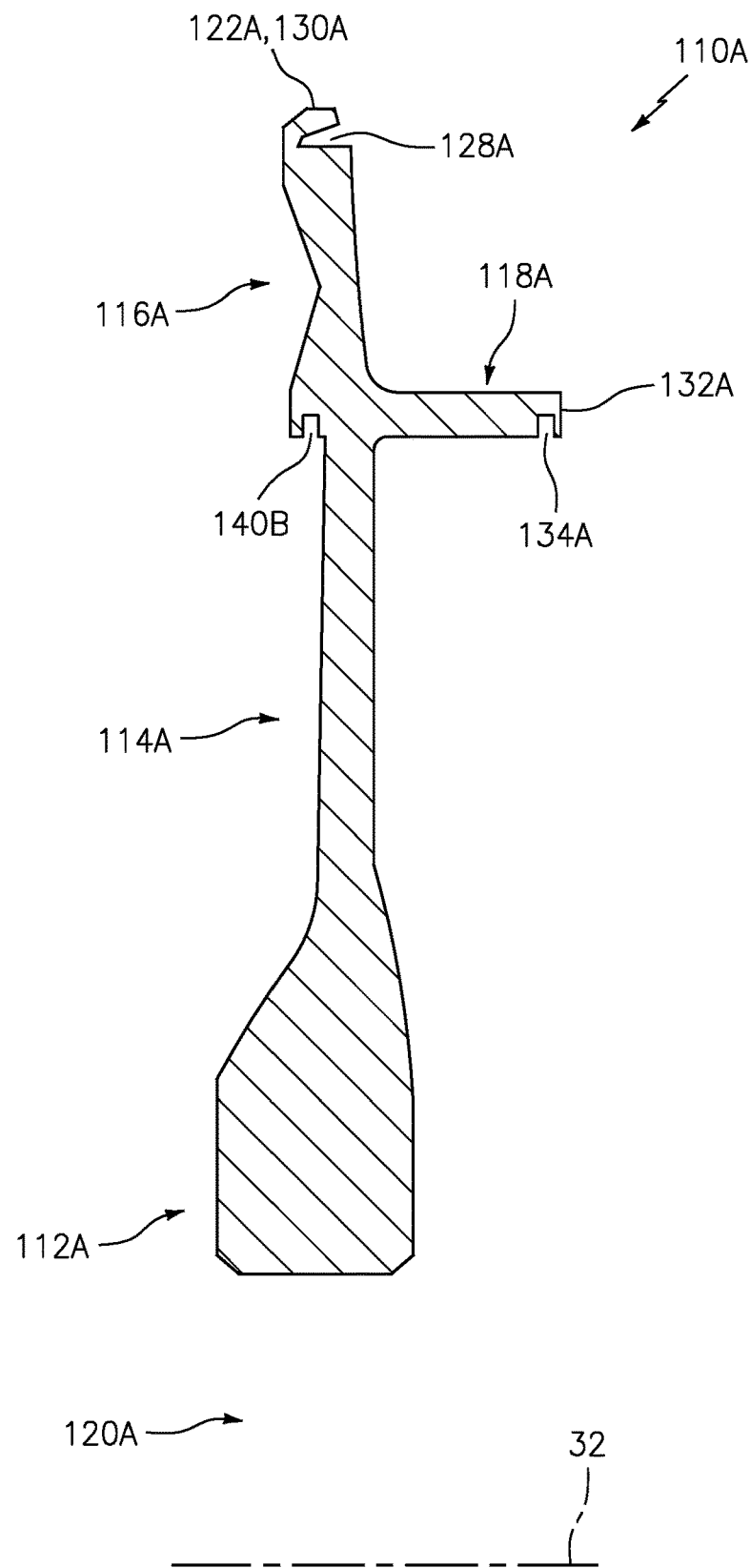
FIG. 13A is a side sectional illustration of a portion of a first rotor disk at a first circumferential position taken along line 13A-13A in FIG. 13C.
Figure 13B:
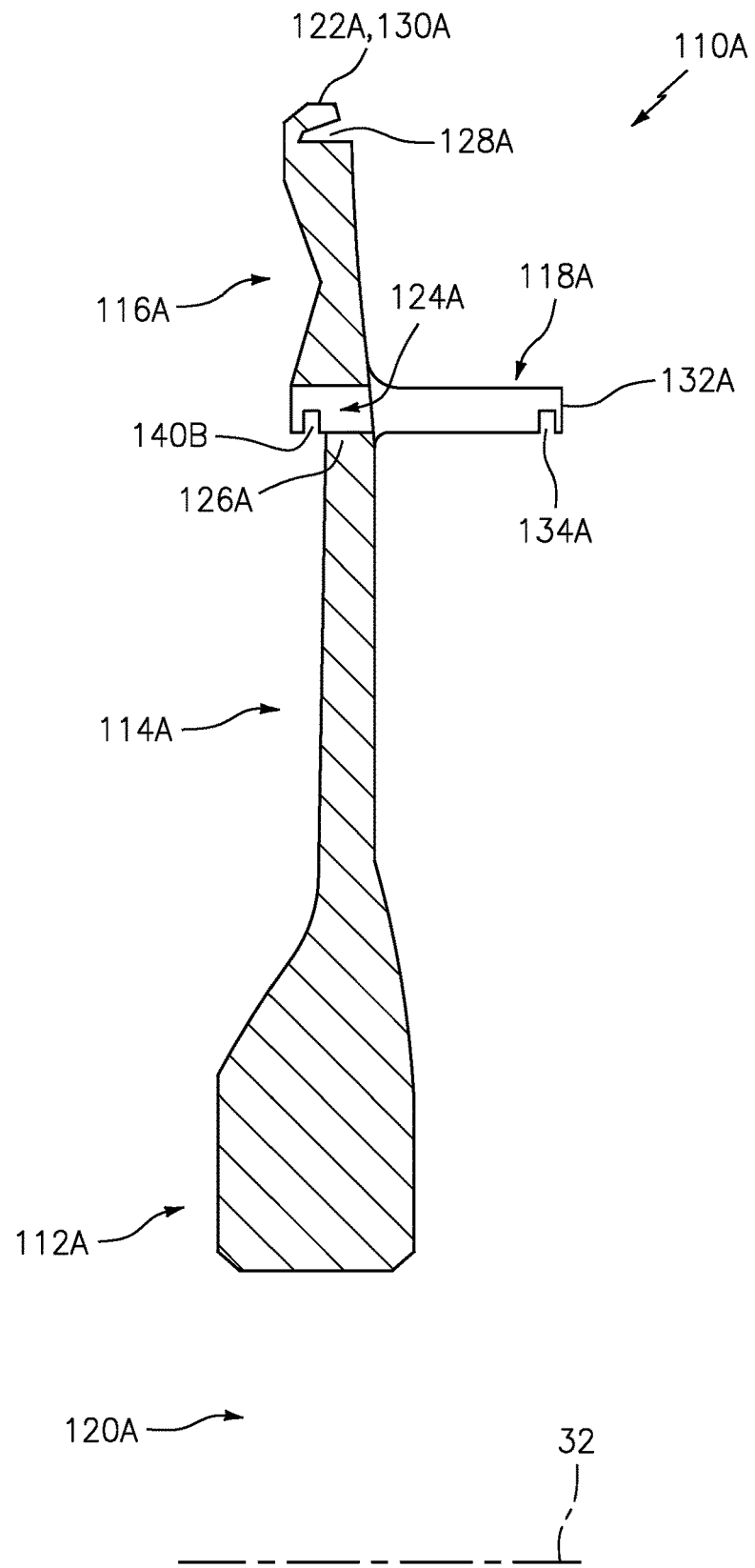
FIG. 13B is a side sectional illustration of a portion of the first rotor disk at a second circumferential position taken along line 13B-13B in FIG. 13C.

The first rotor disk 110A of FIGS. 13A and 13B includes an inner first hub 112A, a first web 114A and an outer first rim 116A. The first rotor disk 110A of FIG. 13A also includes one or more first disk mounts 118A; see also FIG. 13C.

The first hub 112A is an annular segment of the disk 110A and defines an inner bore 120A through the first rotor disk 110A. The first hub 112A may be configured as a rotating mass for the rotor disk 110A. The first web 114A is connected to and extends radially between the first hub 112A and the first rim 116A. The first rim 116A is arranged at an outer distal end 122A of the first rotor disk 110A.

Referring to FIG. 13B, the first rim 116A is configured with one or more first disk mount apertures 124A (e.g., through-holes) located at an inner end 126A of the first rim 116A. These first disk mount apertures 124A are arranged circumferentially around the centerline 32 in an annular array and are interspersed with the first disk mounts 118A; see also FIG. 13C. For example, a respective one of the first disk mounts 118A may be positioned circumferentially between each circumferentially adjacent/neighboring pair of the first disk mount apertures 124A. Similarly, a respective one of the first disk mount apertures 124A may be positioned circumferentially between each circumferentially adjacent/neighboring pair of the first disk mounts 118A. Note in FIG. 13B, elements 118A, 132A and 134A are shown out of plane and for reference only in order to illustrate the relative positioning of aperture 124A.

Figure 13C:
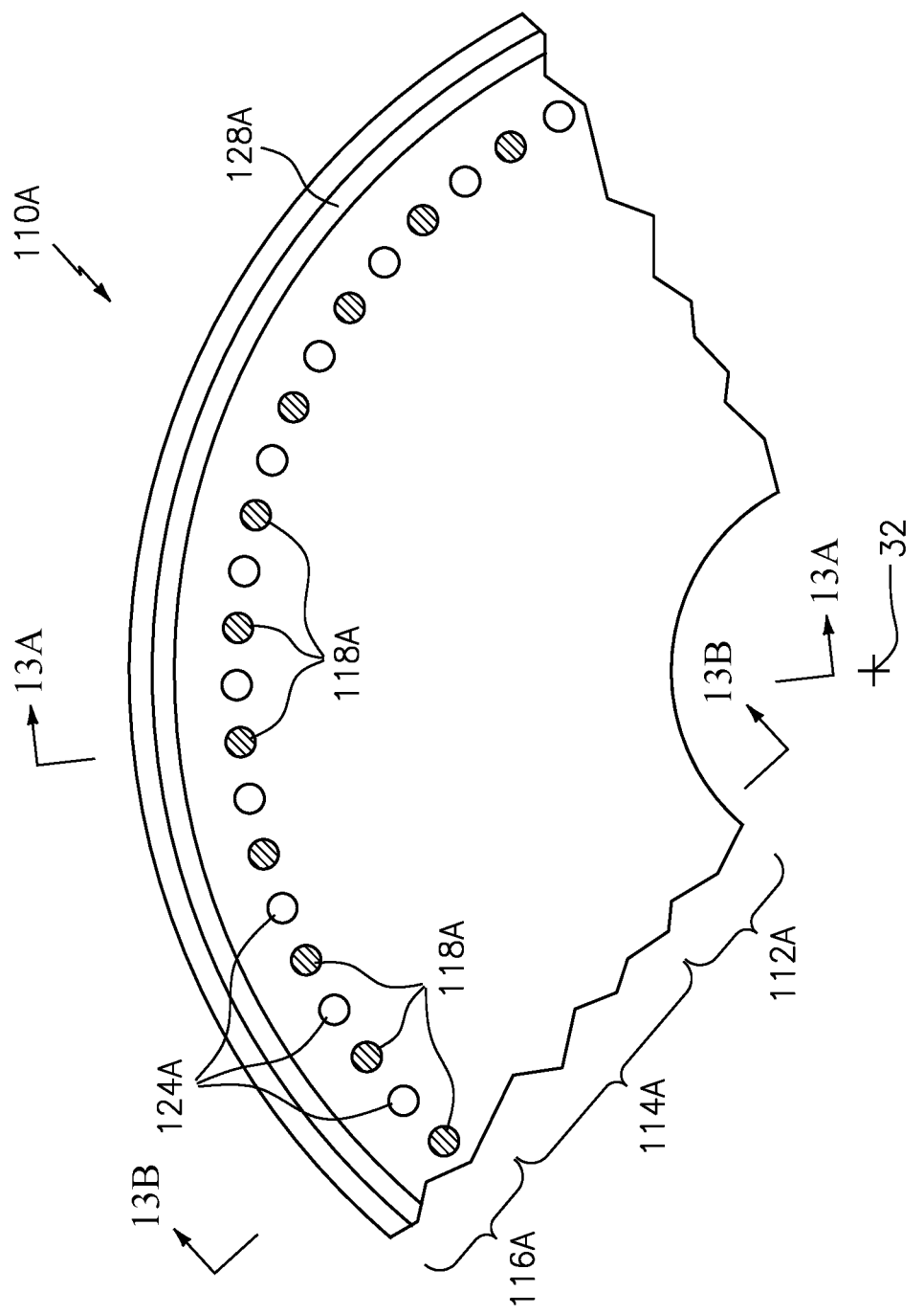
FIG. 13C is a cross-sectional illustration of a circumferential portion of the first rotor disk.

The first rim 116A of FIGS. 13A-13C is also configured with a (e.g., annular) first groove 128A located at an outer end 130A of the first rim 116A. This first groove 128A extends circumferentially about (e.g., completely around) the centerline 32 within the first rim 116A. The first groove 128A extends radially within the first rim 116A.

Referring to FIGS. 13A and 13C, the first disk mounts 118A are arranged circumferentially around the centerline 32 in an annular array and are interspersed with the first disk mount apertures 124A as described above. The first disk mounts 118A are radially aligned with the first disk mount apertures 124A; see also FIG. 13B. Each first disk mount 118A of FIG. 13A is connected to (e.g., formed integral with) the first rim 116A. Each first disk mount 118A projects axially out from and is cantilevered from the first rim 116A in a first axial direction (e.g., an aft/downstream direction) to a distal first disk mount end 132A. Each first disk mount 118A may be configured with a first mount slot 134A proximate the first disk mount end 132A. This first mount slot 134A extends axially within the first disk mount 118A. The first mount slot 134A extends circumferentially through the first disk mount 118A. The first mount slot 134A extends radially outward and partially into the first disk mount 118A.

Figure 14A:
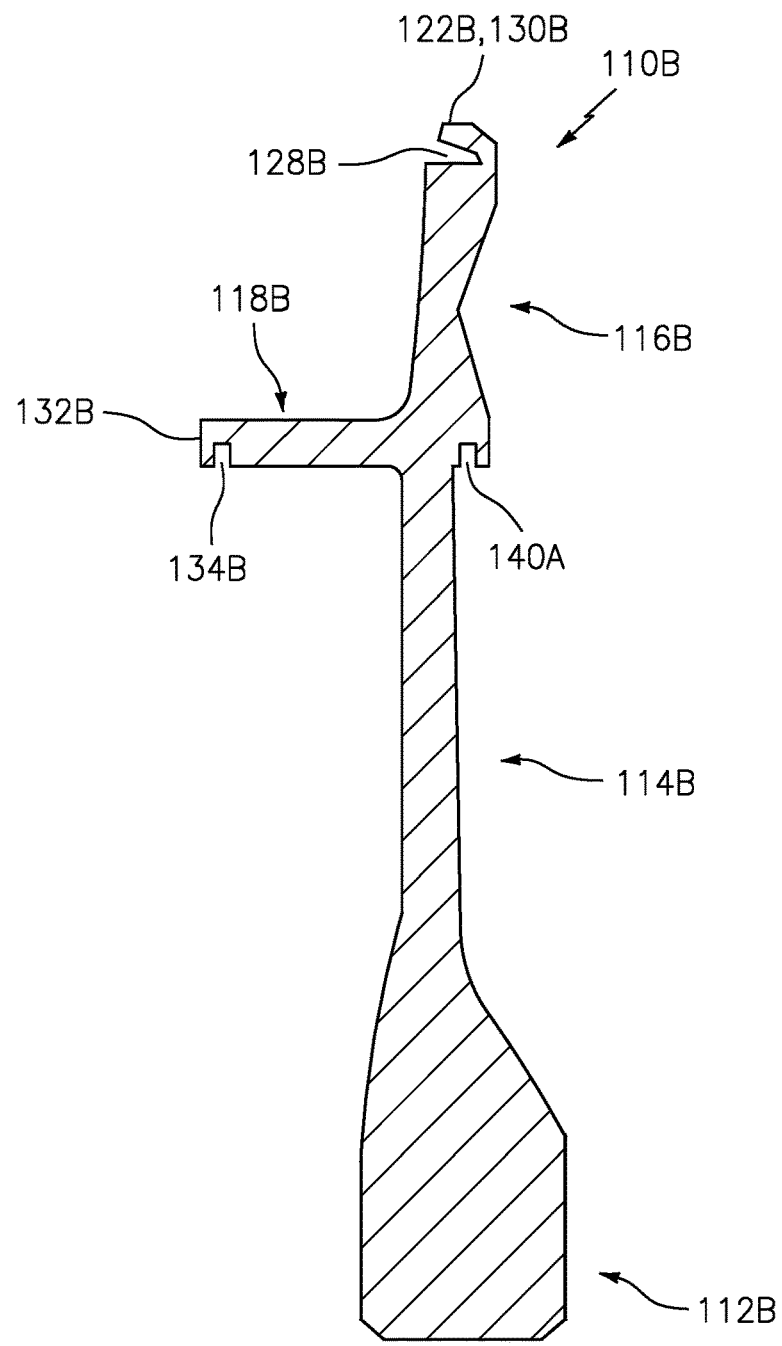
FIG. 14A is a side sectional illustration of a portion of a second rotor disk at a first circumferential position taken along line 14A-14A in FIG. 14C.
Figure 14B:
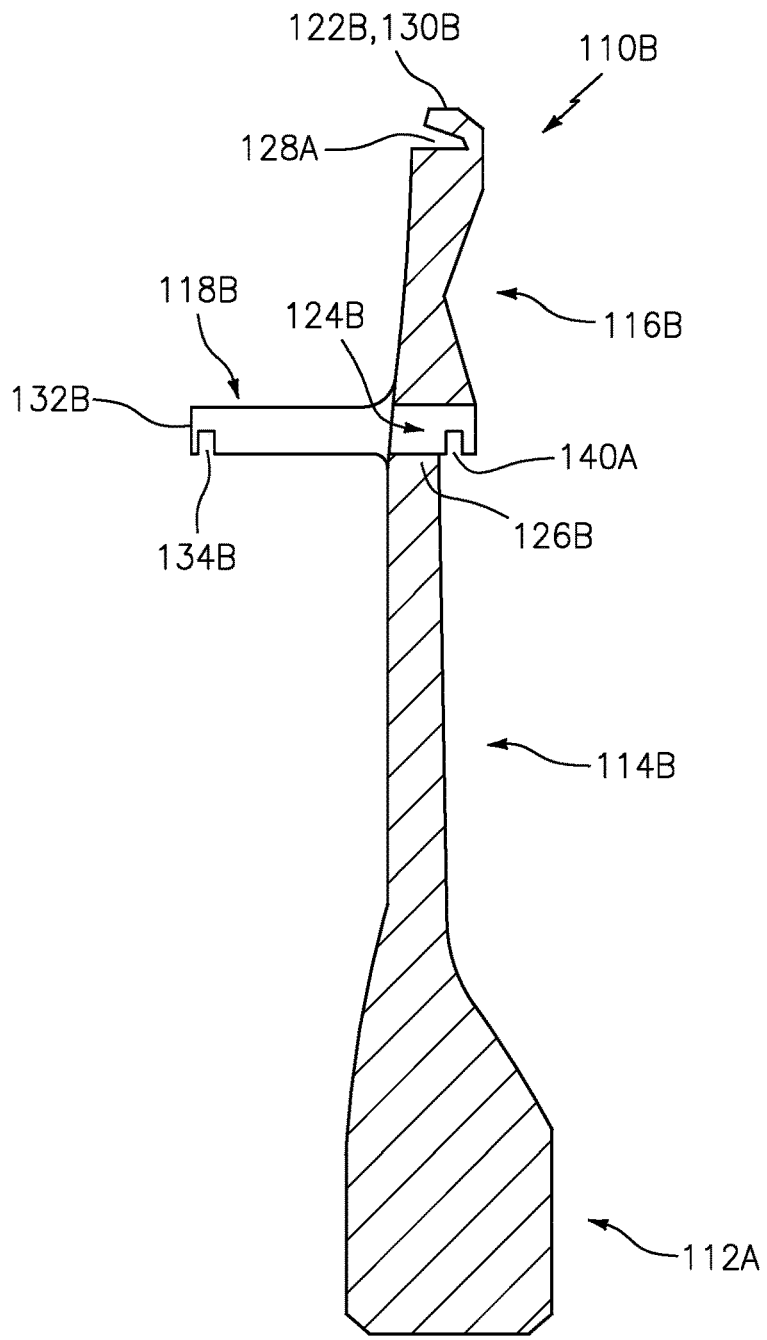
FIG. 14B is a side sectional illustration of a portion of the second rotor disk at a second circumferential position taken along line 14B-14B in FIG. 14C.
Figure 14B:
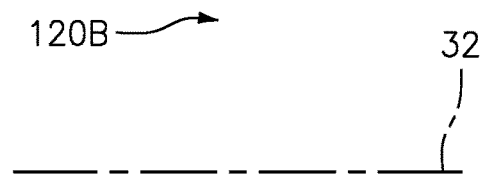

The second rotor disk 110B of FIGS. 14A and 14B includes an inner second hub 112B, a second web 114B and an outer second rim 116B. The second rotor disk 110B of FIG. 14A also includes one or more second disk mounts 118B; see also FIG. 14C.

The second hub 112B is an annular segment and defines an inner bore 120B through the second rotor disk 110B. The second hub 112B may be configured as a rotating mass for the rotor disk 110B. The second web 114B is connected to and extends radially between the second hub 112B and the second rim 116B. The second rim 116B is arranged at an outer distal end 122B of the second rotor disk 110B.

Referring to FIG. 14B, the second rim 116B is configured with one or more second disk mount apertures 124B (e.g., through-holes) located at an inner end 126B of the second rim 116B. These second disk mount apertures 124B are arranged circumferentially around the centerline 32 in an annular array and are interspersed with the second disk mounts 118B; see also FIG. 14C. For example, a respective one of the second disk mounts 118B may be positioned circumferentially between each circumferentially adjacent/neighboring pair of the second disk mount apertures 124B. Similarly, a respective one of the second disk mount apertures 124B may be positioned circumferentially between each circumferentially adjacent/neighboring pair of the second disk mounts 118B. Note in FIG. 14B, elements 118B, 132B and 134B are shown out of plane and for reference only in order to illustrate the relative positioning of aperture 124B.

Figure 14C:
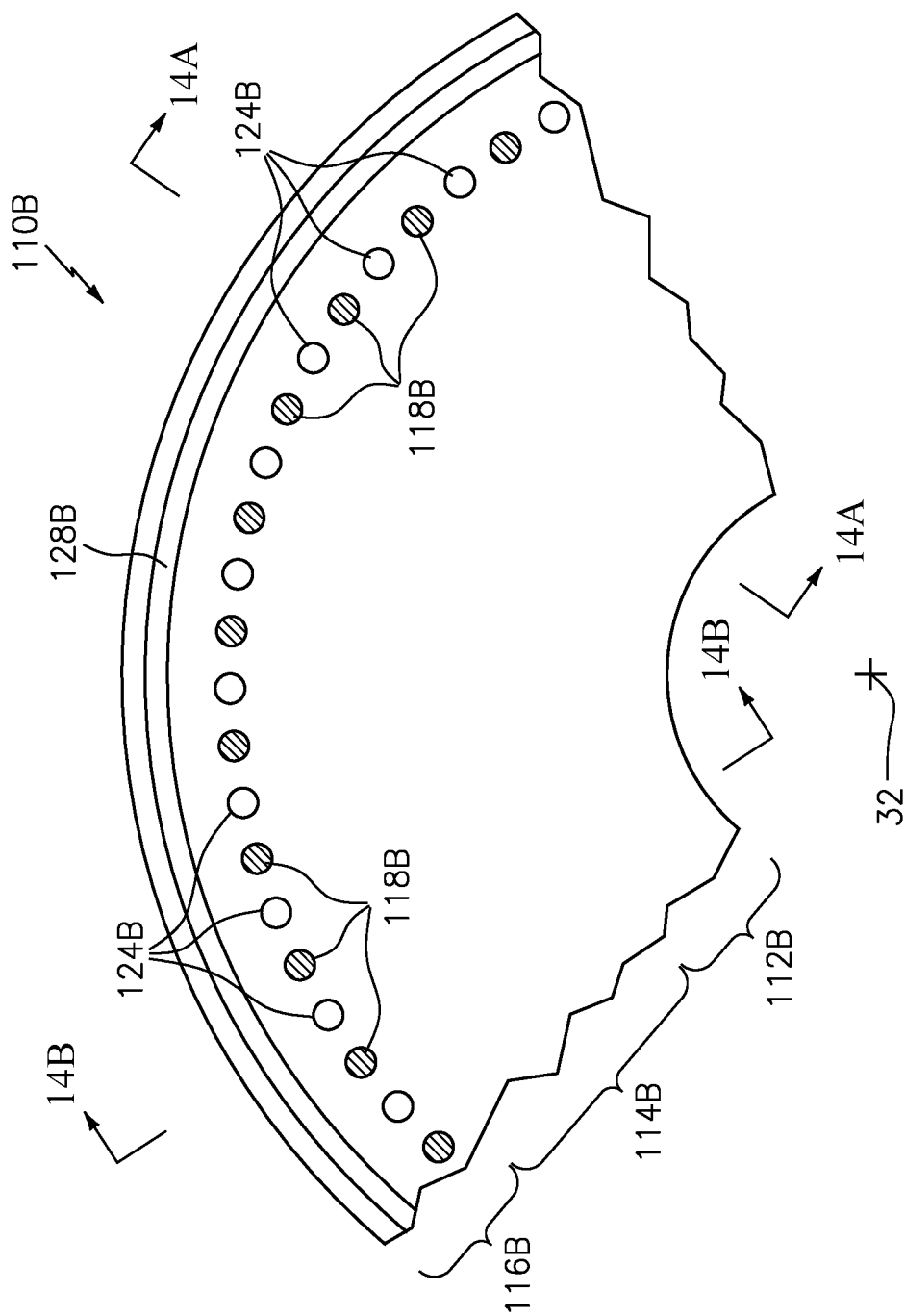
FIG. 14C is a cross-sectional illustration of a circumferential portion of the second rotor disk.

The second rim 116B of FIGS. 14A-14C is also configured with a (e.g., annular) second groove 128B located at an outer end 130B of the second rim 116B. This second groove 128B extends circumferentially about (e.g., completely around) the centerline 32 within the second rim 116B. The second groove 128B extends radially within the second rim 116B.

Referring to FIGS. 14A and 14C, the second disk mounts 118B are arranged circumferentially around the centerline 32 in an annular array and are interspersed with the second disk mount apertures 124B as described above. The second disk mounts 118B are radially aligned with the second disk mount apertures 124B; see also FIG. 14B. Each second disk mount 118B of FIG. 14A is connected to (e.g., formed integral with) the second rim 116B. Each second disk mount 118B projects axially out from and is cantilevered from the second rim 116B in a second axial direction (e.g., a forward/upstream direction) to a distal second disk mount end 132B, which second axial direction is opposite the first axial direction. Each second disk mount 118B may be configured with a second mount slot 134B proximate the second disk mount end 132B. This second mount slot 134B extends axially within the second disk mount 118B. The second mount slot 134B extends circumferentially through the second disk mount 118B. The second mount slot 134B extends radially outward and partially into the second disk mount 118B.

Each rotor disk 110A, 110B may be configured from any suitable material such as, but not limited to, metal. Examples of the metal include, but are not limited to, nickel (Ni), titanium (Ti), aluminum (Al), chromium (Cr) or an alloy of one or more of the foregoing metals; e.g., a single crystal alloy or super alloy. The present disclosure, however, is not limited to the foregoing exemplary rotor disk materials, or metal in general.

Figure 15A:
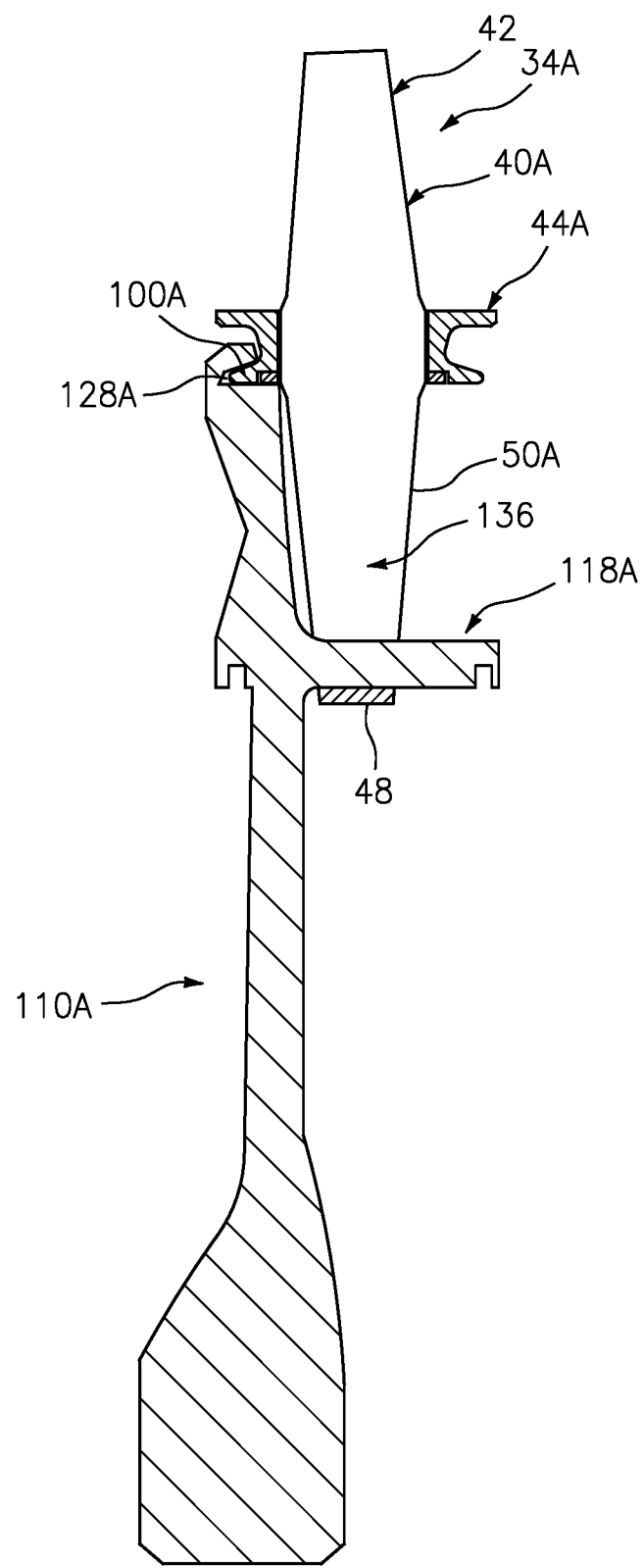
FIG. 15A is a side sectional illustration of the first rotor disk loaded with a first set of the rotor blades viewed looking in a first circumferential direction.
Figure 15B:
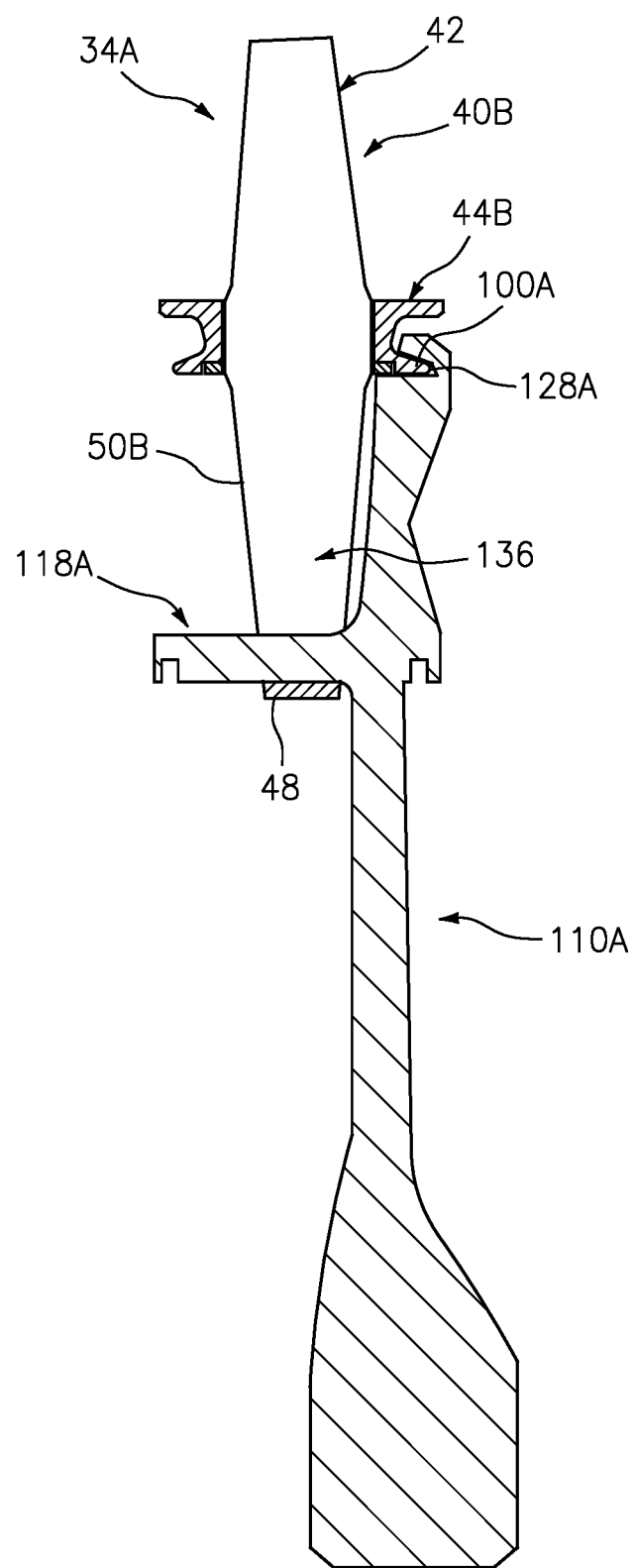
FIG. 15B is a side sectional illustration of the first rotor disk loaded with the first set of the rotor blades viewed looking in a second circumferential direction that is opposite the first circumferential direction.

Referring to FIGS. 15A and 15B, which show different sectional end of the same disk 110A, a first set of the rotor blades 34A are arranged with the first rotor disk 110A. The first flanges 100A of the first rotor blades 34 are mated with the first groove 128A. In particular, each first flange 100A projects axially into and is seated within the first groove 128A. Each first flange 100A thereby radially locates the respective platform segment 44 with the first rotor disk 110A. Furthermore, the rotor blade pairs 42 of the first rotor blades 34 are mated with the first disk mounts 118A. In particular, each first disk mount 118A projects axially through an aperture 136 (e.g., a groove, a channel, etc.) formed laterally (e.g., circumferentially) between the first leg 50A and the second leg 50B; see also FIG. 2. Each first disk mount 118A thereby radially locates and supports the respective rotor blade pair 42 with the first rotor disk 110A.

Figure 16A:
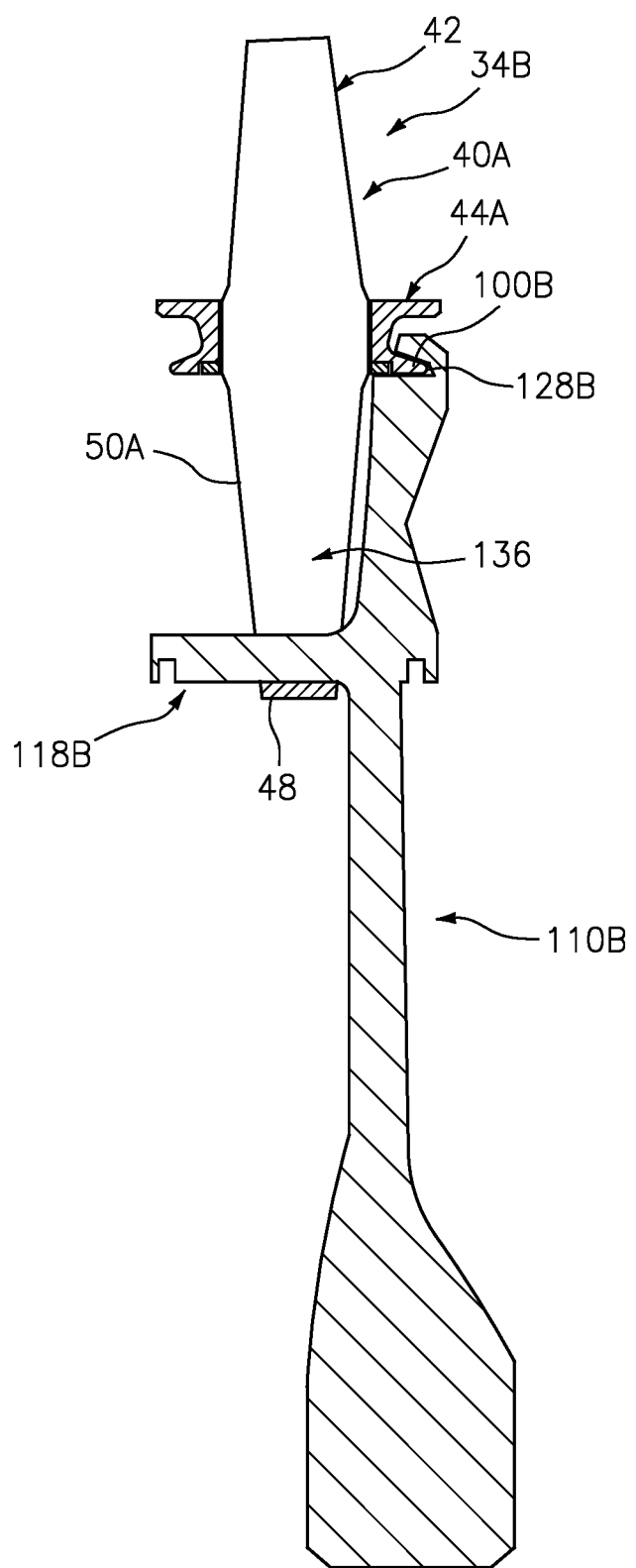
FIG. 16A is a side sectional illustration of the second rotor disk loaded with a second set of the rotor blades viewed looking in the first circumferential direction.
Figure 16B:
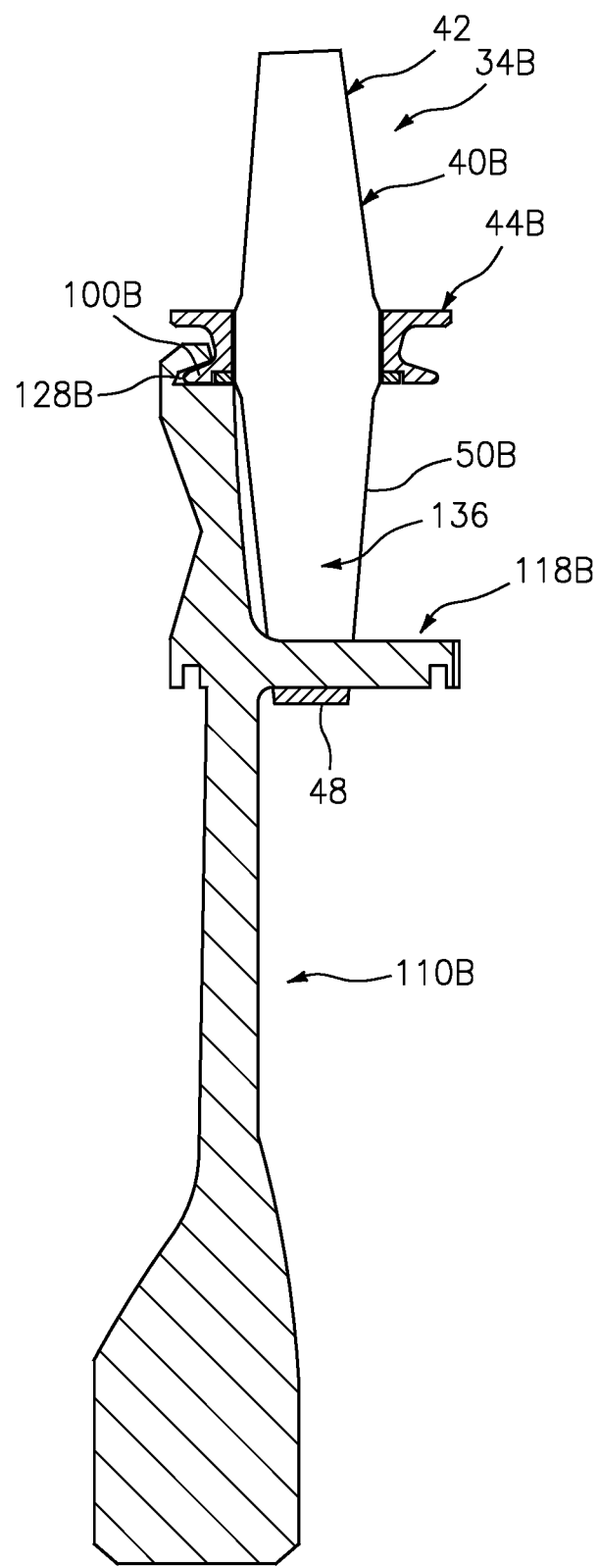
FIG. 16B is a side sectional illustration of the second rotor disk loaded with the second set of the rotor blades viewed looking in the second circumferential direction.

Referring to FIGS. 16A and 16B, which show different sectional end of the same disk 110B, a second set of the rotor blades 34B are arranged with the second rotor disk 110B. The second flanges 100B of the second rotor blades 34 are mated with the second groove 128B. In particular, each second flange 100B projects axially into and is seated within the second groove 128B. Each second flange 100B thereby radially locates the respective platform segment 44 with the second rotor disk 110B. Furthermore, the rotor blade pairs 42 of the second rotor blades 34 are mated with the second disk mounts 118B. In particular, each second disk mount 118B projects axially through the aperture 136 formed laterally (e.g., circumferentially) between the first leg 50A and the second leg 50B. Each second disk mount 118B thereby radially locates and supports the respective rotor blade pair 42 with the second rotor disk 110B.

Figure 17A:
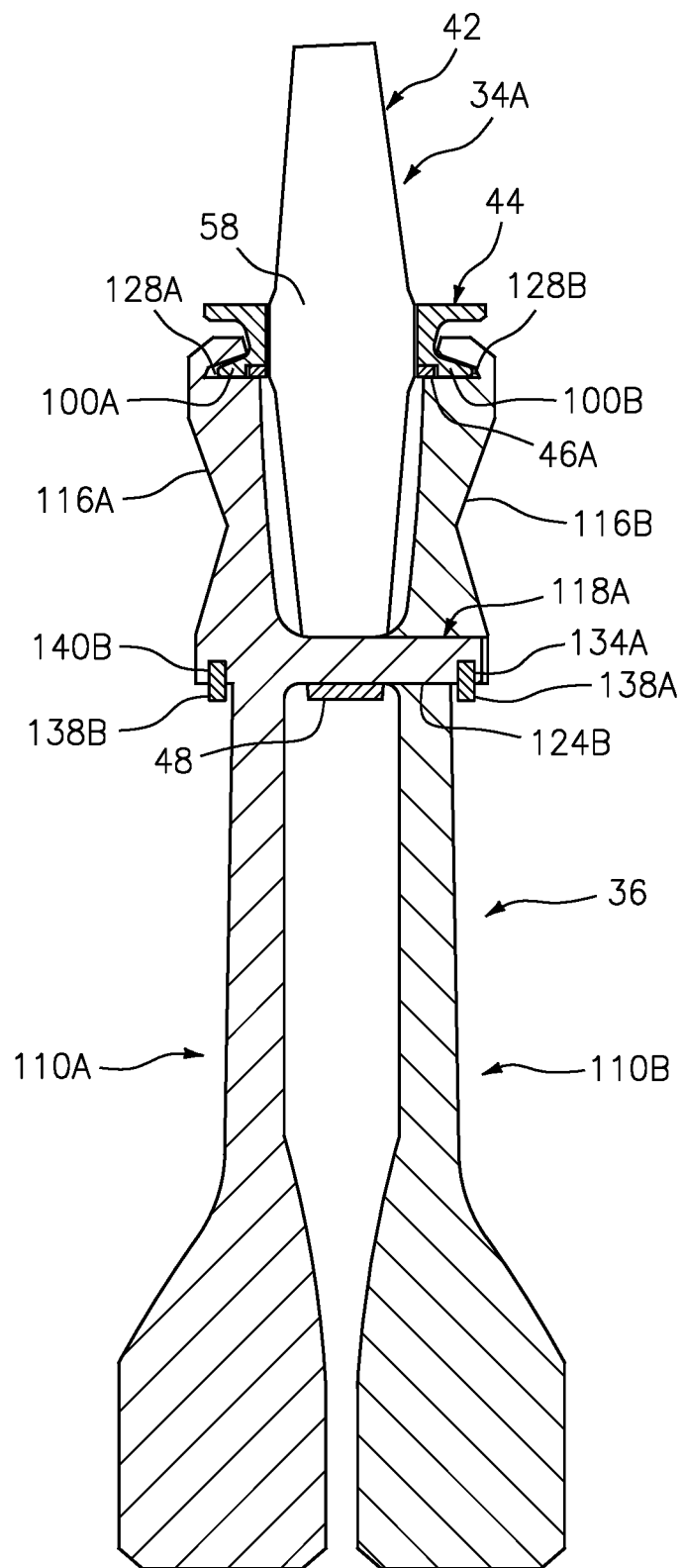
FIG. 17A is a side sectional illustration of a portion of the bladed rotor assembly at a first circumferential position.
Figure 17B:
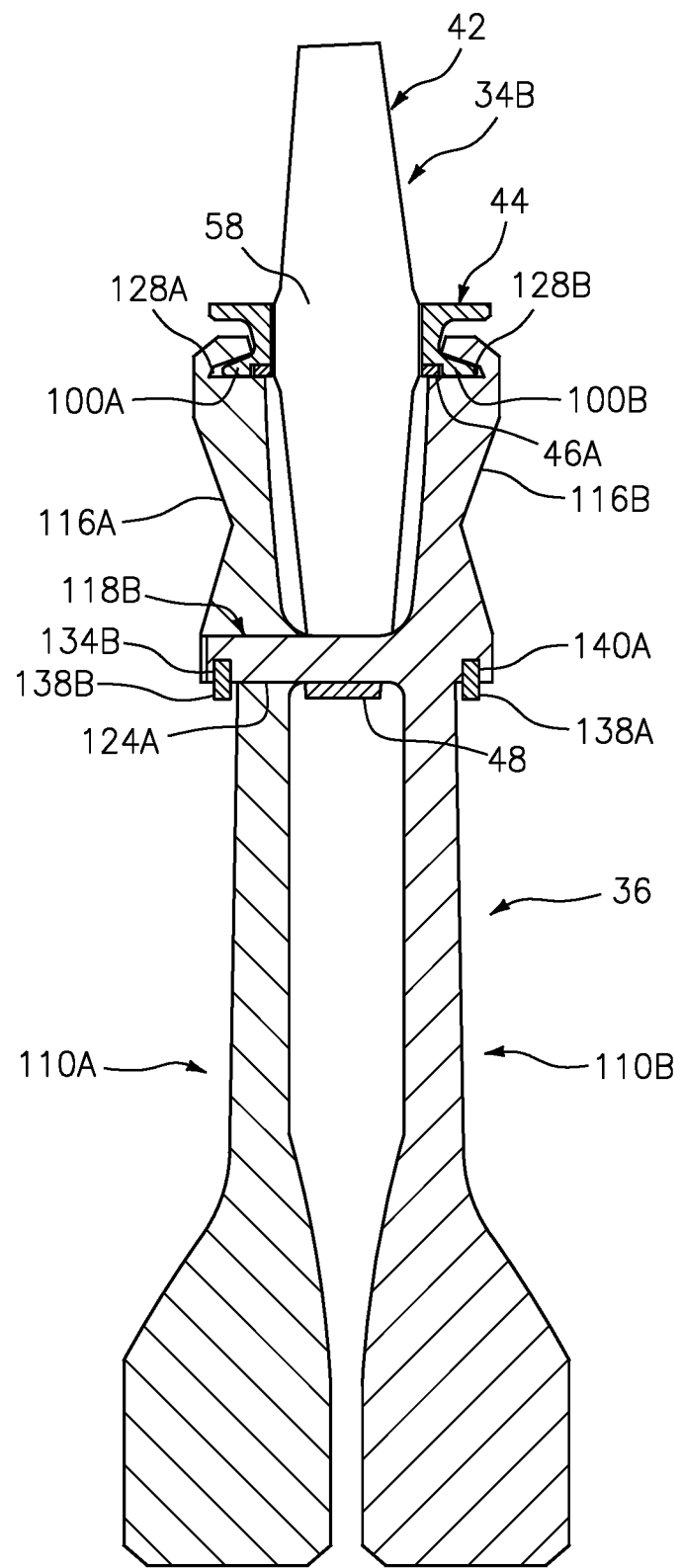
FIG. 17B is a side sectional illustration of a portion of the bladed rotor assembly at a second circumferential position.

Referring to FIGS. 17A and 17B, the first rotor disk 110A loaded with the first rotor blades 34A (see FIG. 17A) and the second rotor disk 110B loaded with the second rotor blades 34B (see FIG. 17B) are mated together. Each of the first disk mounts 118A, for example, may be aligned with a respective one of the second disk mount apertures 124B; see FIG. 17A. Each of the second disk mounts 118B may be aligned with a respective one of the first disk mount apertures 124A; see FIG. 17B. The first rotor disk 110A and the second rotor disk 110B may then be moved (e.g., translated) axially towards one another such that (A) the first disk mounts 118A respectively project axially through the second disk mount apertures 124B and (B) the second disk mounts 118B respectively project axially through the first disk mount apertures 124A. A first retention element 138A (e.g., a retention ring such as, but not limited to, a split ring) is mated with/seated in the slots 134A in the first disk mounts 118A (see FIG. 17A) as well as associated slots 140A in the second rim 116B (see FIG. 17B). Similarly, a second retention element 138B (e.g., a retention ring such as, but not limited to, a split ring) is mated with/seated in the slots 134B in the second disk mounts 118B (see FIG. 17B) as well as associated slots 140B in the first rim 116A (see FIG. 17A). The first disk mounts 118A and the second disk mounts 118B thereby connect the first rotor disk 110A and the second rotor disk 110B together. Each disk mount 118A, 118B also supports/mounts a respective one of the rotor blades 34 with the rotor disk assembly 36.

During rotation of the rotor assembly 30 of FIGS. 17A and 17B about the centerline 32, centrifugal force may push the components 42, 44 and 46 radially outward. The first flanges 100A and the second flanges 100B are thereby pressed outward respectively against an outer groove surface in the first rim 116A and an outer groove surface in the second rim 116B. The platform segments 44 are thereby sealed against the first rotor disk 110A and the second rotor disk 110B. The rotor blade elements 46 are similarly pressed outward against the respective platform segment 44. The rotor blade elements 46 thereby respectively seal a gap between the platform segments 44 and the lands 58 as described above. In addition, the bridges 48 are pressed outwards against the disk mounts 118A, 118B. The disk mounts 118A, 118B thereby radially support (e.g., radially retain) and mount the rotor blade pairs 42 to the rotor disk assembly 36.

Thermal differentials between the components 42, 44, 46 and 110 may result in thermally induced movement between those components 42, 44, 46 and 110. Such movement may be at least partially accommodated by providing a sliding joint between the lands 58 and the rotor blade elements 46. In addition, relative motion between the component 46 and the platform segment 44 and the lands 58 created by small vibratory deflections in one or more components may result in a vibrational dampening characteristic. This embodiment may thereby address possible vibratory modes in the airfoils 40A and 40B.

In some embodiments, referring to FIGS. 17A and 17B, the first rotor disk 110A and its first rim 116A may radially and circumferentially cover at least an inner radial portion of each of the rotor blades 34. The first rotor disk 110A and its first rim 116A may also radially and circumferentially cover at least an inner radial portion of each of the platform segments 44. In addition or alternatively, the second rotor disk 110B and its second rim 116B may radially and circumferentially cover at least an inner radial portion of each of the rotor blades 34. The second rotor disk 110B and its second rim 116B may also radially and circumferentially cover at least an inner radial portion of each of the platform segments 44. With such an arrangement, the rotor disks 110A and/or 110B may eliminate need for a traditional sealing device such as a cover plate to cover attachment slots.

In some embodiments, the second disk mounts 118B may be configured with the first rotor disk 110A such that all of the disk mounts 118 are connected to (e.g., integral with) and project out from the first rotor disk 110A; e.g., similar to as shown in FIG. 17A. In such embodiments, the second disk 110B may be configured without any integral disk mounts and may just include the apertures 124B. Alternatively, the first disk mounts 118A may be configured with the second rotor disk 110B such that all of the disk mounts 118 are connected to (e.g., integral with) and project out from the second rotor disk 110B; e.g., similar to as shown in FIG. 17B. In such embodiments, the first disk 110A may be configured without any integral disk mounts and may just include the apertures 124A.

Figure 18:
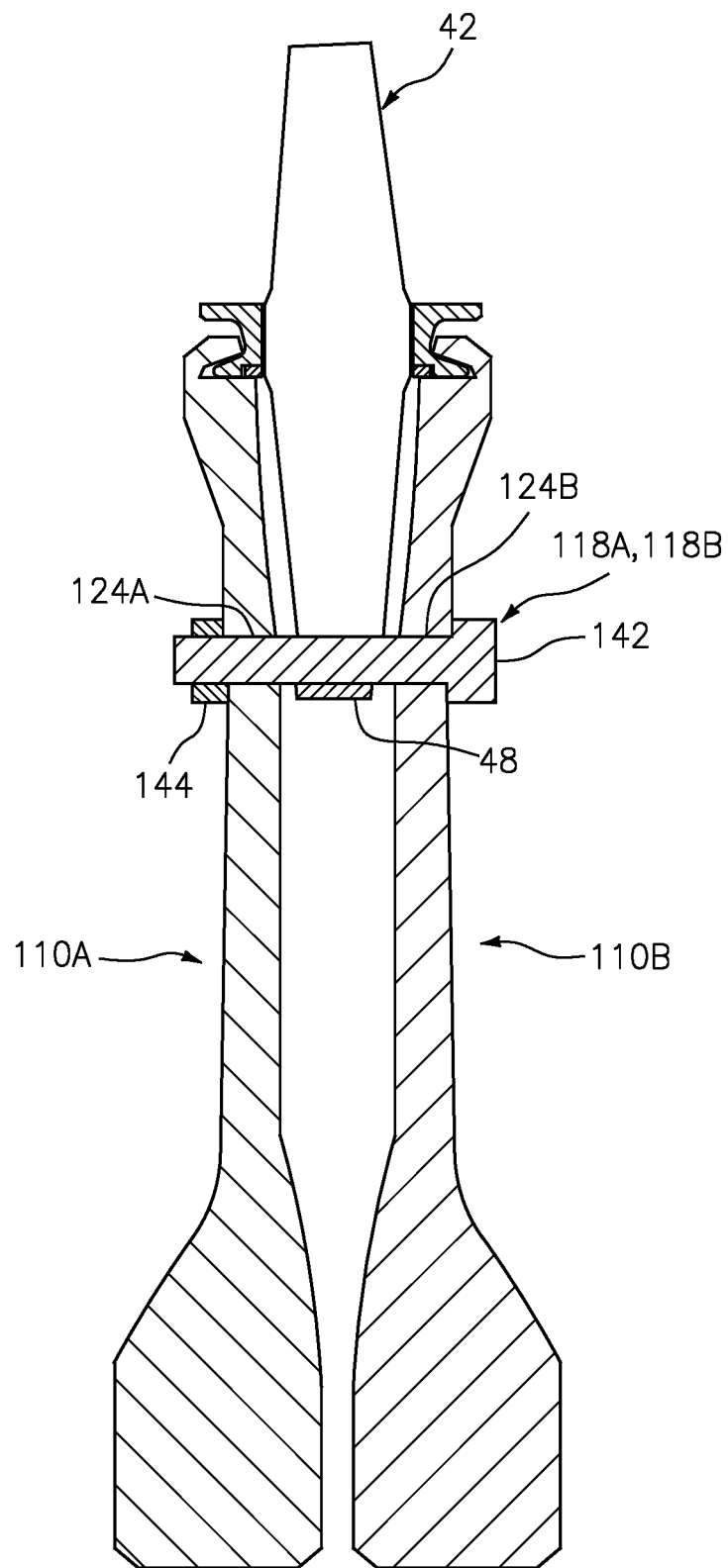
FIG. 18 is a side sectional illustration of a portion of the blade rotor assembly with alternate disk mounts.

In some embodiments, referring to FIG. 18, the first disk mounts 118A and/or the second disk mounts 118B may each be formed discrete from the rotor disks 110A, 110B. For example, each disk mount 118 may alternatively be configured as a fastener such as, but not limited to, a tie rod/bolt 142 and a nut 144. In such embodiments, each disk mount 118 projects axially and sequentially through respective apertures in the components 110B, 42 and 110A.

Referring to FIGS. 19 and 20, each disk mount 118 is configured with a cross-section conformed to/match with a geometry of the blade mount 38. Each disk mount 118 of FIG. 19, for example, has a circular cross-section when viewed in a plane perpendicular to the centerline 32. In another example, each disk mount 118 of FIG. 20 has an elongated (e.g., oval, elliptical, etc.) cross-section when viewed in a plane perpendicular to the centerline 32.

Figure 21:
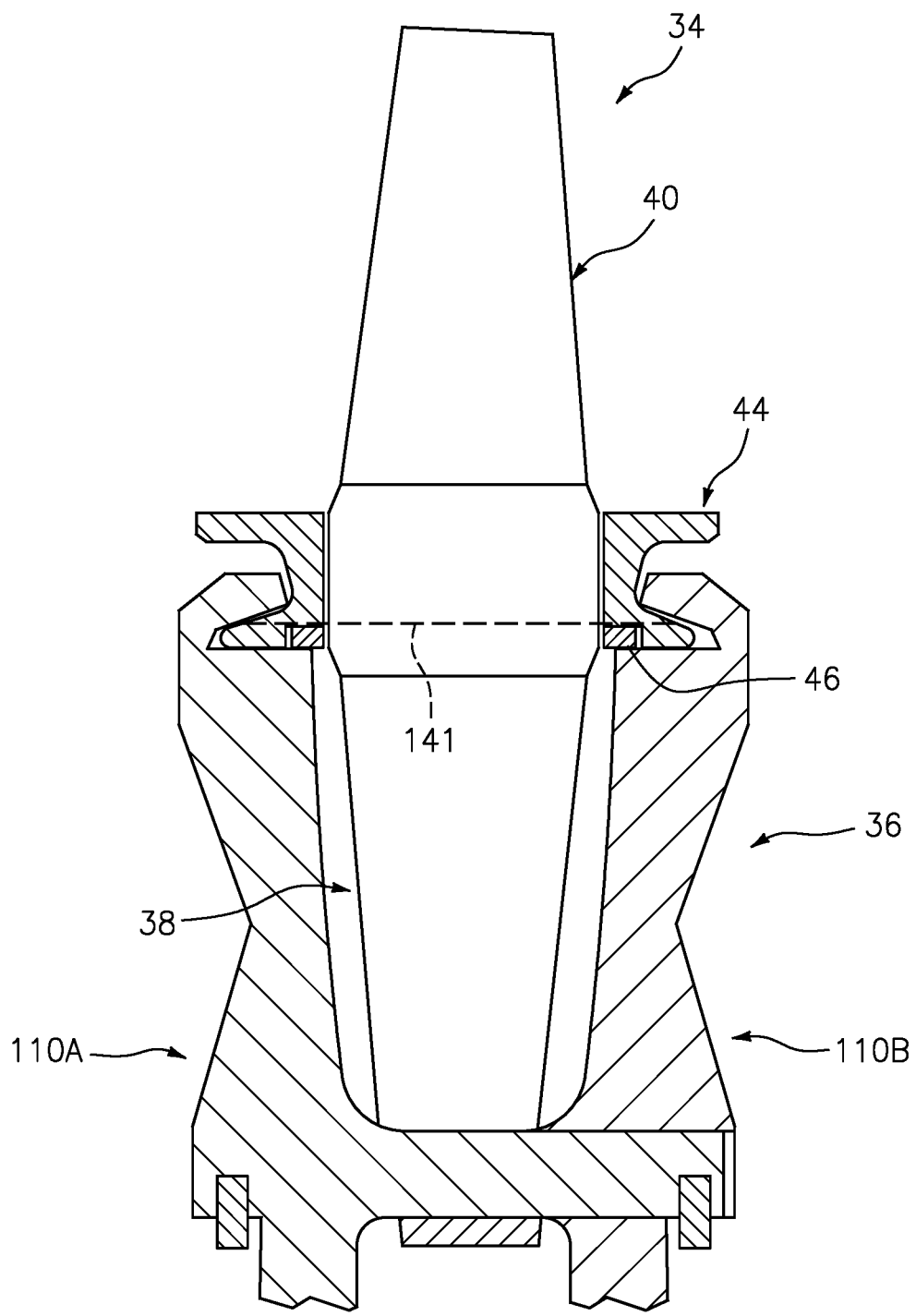
FIG. 21 is a side sectional illustration of a portion of another bladed rotor assembly at the first circumferential position.
Figure 22:
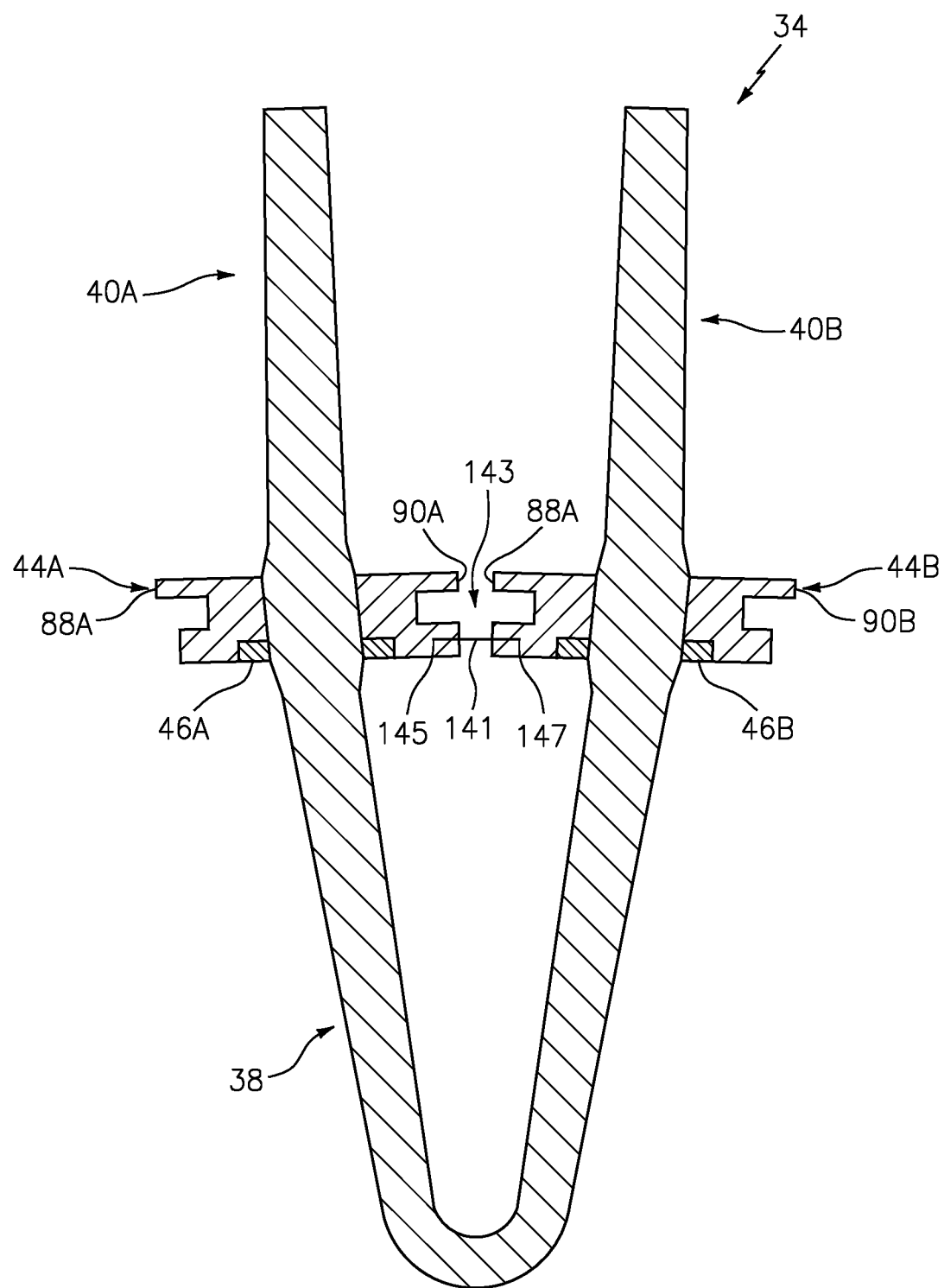
FIG. 22 is a cross-sectional illustration of a portion of the rotor blade of the bladed rotor assembly of FIG. 21 viewed in a plane perpendicular to the rotational axis.

In some embodiments, referring to FIGS. 21 and 22, one or more or each of the rotor blades 34 may include at least one intra-platform seal element 141 (shown by dashed lines in FIG. 21 to depict relative placement). The seal element of FIGS. 21 and 22 is configured to seal a (e.g., axially and laterally extending) gap 143 between the sides 90A and 88B of the platform segments 44A and 44B. This seal element 141 may be configured as a feather seal. Referring to FIG. 22, the seal element 141, for example, may have a generally planar body that projects laterally into a slot 145 in the platform segment 44A and/or a slot 147 in the platform segment 44B. Referring to FIG. 21, the seal element 141 may have an axial length that is substantially equal to (e.g., within 10 or 20% of) or exactly equal to an axial length of the platform segments 44. The seal element 141 may thereby prevent or reduce hot gas flow radially inward into the rotor assembly 30 through the gap 143 (see FIG. 22). Such seal elements 141 may be installed prior to and/or during the mating of the rotor disks 110 together; e.g., see FIGS. 17A and 17B. It should be noted, while each seal element 141 is described above as sealing a respective gap 143 between the platform segments 44 of a common rotor blade 34, such seal elements 141 may also or alternatively respectively seal gaps between platform segments 44 of circumferentially neighboring rotor blades 34.

The seal element 141 is constructed from seal element material; e.g., metal. Examples of the seal element material include, but are not limited to, cobalt, nickel or an alloy of one or more of the foregoing metals. The seal element 141, for example, may be formed from (e.g., cobalt and/or nickel alloy) sheet metal. The present disclosure, however, is not limited to the foregoing exemplary seal element materials, or to the foregoing exemplary feather seal configuration.

Figure 23:
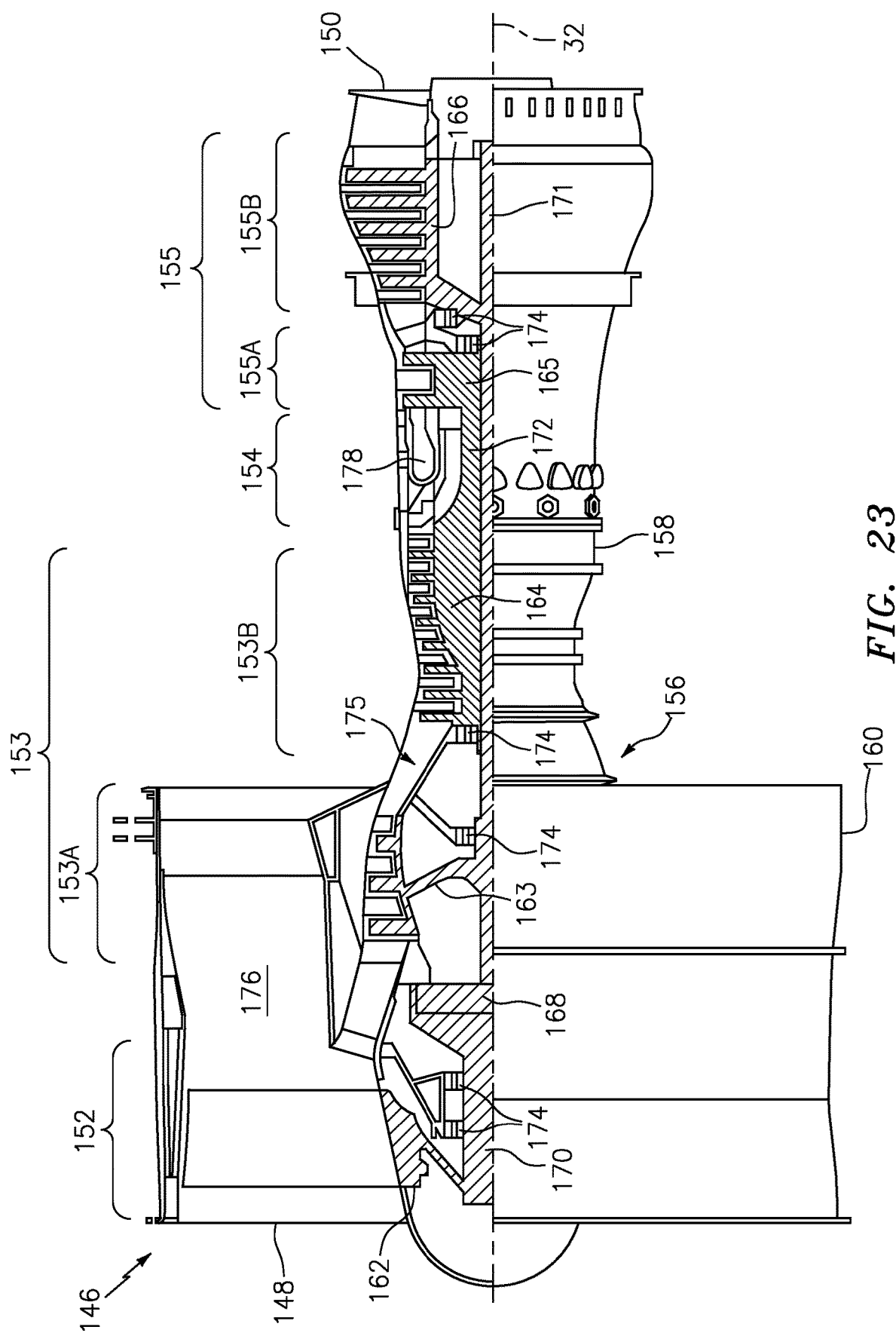
FIG. 23 is a side cutaway illustration of a gas turbine engine.

FIG. 23 is a side cutaway illustration of a geared turbine engine 146 with which the rotor assembly 30 may be included. This turbine engine 146 extends along the centerline 32 between an upstream airflow inlet 148 and a downstream airflow exhaust 150. The turbine engine 146 includes a fan section 152, a compressor section 153, a combustor section 154 and a turbine section 155. The compressor section 153 includes a low pressure compressor (LPC) section 153A and a high pressure compressor (HPC) section 153B. The turbine section 155 includes a high pressure turbine (HPT) section 155A and a low pressure turbine (LPT) section 155B.

The engine sections 152-155B are arranged sequentially along the centerline 32 within an engine housing 156. This housing 156 includes an inner case 158 (e.g., a core case) and an outer case 160 (e.g., a fan case). The inner case 158 may house one or more of the engine sections 153A-155B; e.g., an engine core. The outer case 160 may house at least the fan section 152.

Each of the engine sections 152, 153A, 153B, 155A and 155B includes a respective rotor 162-166, any one of which may be configured as or may include the rotor assembly 30 of FIG. 1. The rotor assembly 30, for example, may be included in one of the turbine rotors 165 or 166. Each of the rotors 162-166 of FIG. 21 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 162 is connected to a gear train 168, for example, through a fan shaft 170. The gear train 168 and the LPC rotor 163 are connected to and driven by the LPT rotor 166 through a low speed shaft 171. The HPC rotor 164 is connected to and driven by the HPT rotor 165 through a high speed shaft 172. The shafts 170-172 are rotatably supported by a plurality of bearings 174; e.g., rolling element and/or thrust bearings. Each of these bearings 174 is connected to the engine housing 156 by at least one stationary structure such as, for example, an annular support strut.

During operation, air enters the turbine engine 146 through the airflow inlet 148. This air is directed through the fan section 152 and into a core gas path 175 (e.g., the gas path 76 in FIGS. 2-4) and a bypass gas path 176. The core gas path 175 extends sequentially through the engine sections 153A-155B. The air within the core gas path 175 may be referred to as "core air". The bypass gas path 176 extends through a bypass duct, which bypasses the engine core. The air within the bypass gas path 176 may be referred to as "bypass air".

The core air is compressed by the compressor rotors 163 and 164 and directed into a combustion chamber 178 of a combustor in the combustor section 154. Fuel is injected into the combustion chamber 178 and mixed with the compressed core air to provide a fuel-air mixture. This fuel air mixture is ignited and combustion products thereof flow through and sequentially cause the turbine rotors 165 and 166 to rotate. The rotation of the turbine rotors 165 and 166 respectively drive rotation of the compressor rotors 164 and 163 and, thus, compression of the air received from a core airflow inlet. The rotation of the turbine rotor 166 also drives rotation of the fan rotor 162, which propels bypass air through and out of the bypass gas path 176. The propulsion of the bypass air may account for a majority of thrust generated by the turbine engine 146, e.g., more than seventy-five percent (75%) of engine thrust. The turbine engine 146 of the present disclosure, however, is not limited to the foregoing exemplary thrust ratio.

The rotor assembly 30 and/or its rotor blades 34 may be included in various turbine engines other than the one described above as well as in other types of rotational equipment. The rotor assembly 30 and/or its rotor blades 34, for example, may be included in a geared turbine engine where a gear train connects one or more shafts to one or more rotors in a fan section, a compressor section and/or any other engine section. Alternatively, the rotor assembly 30 and/or its rotor blades 34 may be included in a turbine engine configured without a gear train. The rotor assembly 30 and/or its rotor blades 34 may be included in a geared or non-geared turbine engine configured with a single spool, with two spools (e.g., see FIG. 23), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A rotor assembly for a gas turbine engine, comprising:
a first rotor disk configured to rotate about a rotational axis;
a second rotor disk configured to rotate about the rotational axis;
a plurality of rotor blades arranged circumferentially around the rotational axis, each of the plurality of rotor blades mounted to the first rotor disk and to the second rotor disk, and the plurality of rotor blades comprising a first rotor blade; and
a plurality of disk mounts, each of the plurality of disk mounts connecting the first rotor disk and the second rotor disk together, and the plurality of disk mounts comprising a first disk mount that further supports the first rotor blade;
the first rotor blade including a first airfoil, a second airfoil and a forked mount with a first leg and a second leg;
the first airfoil connected to the first leg;
the second airfoil connected to the second leg; and
the first disk mount projecting axially through a channel formed by and between the first leg and the second leg, and the first disk mount radially engaging the forked mount.

2. The rotor assembly of claim 1, wherein the first disk mount radially retains the first rotor blade with the first rotor disk and the second rotor disk.

3. The rotor assembly of claim 1, wherein the first disk mount projects axially through at least the first rotor blade and the first rotor disk.

4. The rotor assembly of claim 3, wherein
the plurality of rotor blades further comprises a second rotor blade that circumferentially neighbors the first rotor blade;
the plurality of disk mounts further comprises a second disk mount that further supports the second rotor blade; and
the second disk mount projects axially through at least the second rotor blade and the first rotor disk.

5. The rotor assembly of claim 4, wherein the second disk mount is integral with and is cantilevered from the second rotor disk.

6. The rotor assembly of claim 3, wherein
the plurality of rotor blades further comprises a second rotor blade that circumferentially neighbors the first rotor blade;
the plurality of disk mounts further comprises a second disk mount that further supports the second rotor blade; and
the second disk mount projects axially through at least the second rotor blade and the second rotor disk.

7. The rotor assembly of claim 3, further comprising a retention ring extending circumferentially through a slot in first disk mount.

8. The rotor assembly of claim 1, wherein the first disk mount has a circular cross-section or an elongated cross-section when viewed in a plane perpendicular to the rotational axis.

9. The rotor assembly of claim 1, wherein the first rotor blade comprises ceramic.

10. The rotor assembly of claim 1, wherein the first rotor blade further includes:
a first platform segment mounted on the first leg and radially retained by the first rotor disk and/or the second rotor disk; and
a second platform segment mounted on the second leg and radially retained by the first rotor disk and/or the second rotor disk.

11. The rotor assembly of claim 10, wherein the first rotor blade further includes:
a first element mounted on the first leg and seated in a first notch in the first platform segment, the first element configured as at least one of a first seal element or a first damper element; and
a second element mounted on the second leg and seated in a second notch in the second platform segment, the second element configured as at least one of a second seal element or a second damper element.

12. The rotor assembly of claim 1, wherein
a first flange of the first platform segment projects axially into the first rotor disk; and
a second flange of the second platform segment projects axially into the first rotor disk.

13. The rotor assembly of claim 1, wherein at least one of
the first rotor disk radially and circumferentially covers at least an inner radial portion of the first rotor blade; or
the second rotor disk radially and circumferentially covers at least the inner radial portion of the first rotor blade.

14. A rotor assembly for a gas turbine engine, comprising:
a first rotor disk configured to rotate about a rotational axis;
a second rotor disk configured to rotate about the rotational axis;
a plurality of rotor blades arranged circumferentially around the rotational axis, each of the plurality of rotor blades mounted to the first rotor disk and to the second rotor disk, and the plurality of rotor blades comprising a first rotor blade; and
a plurality of disk mounts, each of the plurality of disk mounts connecting the first rotor disk and the second rotor disk together, and the plurality of disk mounts comprising a first disk mount that further supports the first rotor blade;
wherein the first disk mount projects axially through at least the first rotor blade and the first rotor disk; and
wherein the first disk mount is integral with and is cantilevered from the second rotor disk.

15. A rotor assembly for a gas turbine engine, comprising:
a first rotor disk configured to rotate about a rotational axis;
a second rotor disk configured to rotate about the rotational axis;
a plurality of rotor blades arranged circumferentially around the rotational axis, each of the plurality of rotor blades mounted to the first rotor disk and to the second rotor disk, and the plurality of rotor blades comprising a first rotor blade; and
a plurality of disk mounts, each of the plurality of disk mounts connecting the first rotor disk and the second rotor disk together, and the plurality of disk mounts comprising a first disk mount that further supports the first rotor blade;
wherein the first disk mount projects axially through at least the first rotor blade and the first rotor disk;

wherein the plurality of rotor blades further comprises a second rotor blade that circumferentially neighbors the first rotor blade;

wherein the plurality of disk mounts further comprises a second disk mount that further supports the second rotor blade;

wherein the second disk mount projects axially through at least the second rotor blade and the second rotor disk; and wherein the second disk mount is integral with and is cantilevered from the first rotor disk.

16. A rotor assembly for a gas turbine engine, comprising:

a first rotor disk configured to rotate about a rotational axis;

a second rotor disk configured to rotate about the rotational axis;

a plurality of rotor blades arranged circumferentially around the rotational axis, each of the plurality of rotor blades mounted to the first rotor disk and to the second rotor disk, and the plurality of rotor blades comprising a first rotor blade;

a plurality of disk mounts, each of the plurality of disk mounts connecting the first rotor disk and the second rotor disk together, and the plurality of disk mounts comprising a first disk mount that further supports the first rotor blade; and a retention ring extending circumferentially through a slot in first disk mount;

wherein the first disk mount projects axially through at least the first rotor blade and the first rotor disk; and wherein the retention ring further extends circumferentially through a slot in the first rotor disk.

* * * * *